United States Patent
Rauscher et al.

(10) Patent No.: US 12,311,583 B2
(45) Date of Patent: May 27, 2025

(54) MOLD FOR PROCESSING EXPANDABLE OR EXPANDED PLASTIC PARTICLES

(71) Applicant: SIEGFRIED HOFMANN GMBH, Lichtenfels (DE)

(72) Inventors: André Rauscher, Lichtenfels (DE); Jonas Beck, Lichtenfels (DE); René Hubert, Lichtenfels (DE); Philipp Platsch, Lichtenfels (DE)

(73) Assignee: SIEGFRIED HOFMANN GMBH, Lichtenfels (DE)

( * ) Notice: Subject to any disclaimer, the term of this patent is extended or adjusted under 35 U.S.C. 154(b) by 131 days.

(21) Appl. No.: 17/926,890

(22) PCT Filed: May 20, 2021

(86) PCT No.: PCT/EP2021/063481
§ 371 (c)(1),
(2) Date: Nov. 21, 2022

(87) PCT Pub. No.: WO2021/234096
PCT Pub. Date: Nov. 25, 2021

(65) Prior Publication Data
US 2023/0241814 A1    Aug. 3, 2023

(30) Foreign Application Priority Data
May 22, 2020    (DE) ..................... 10 2020 113 838.5

(51) Int. Cl.
*B29C 44/58*    (2006.01)
*B29C 44/04*    (2006.01)
(Continued)

(52) U.S. Cl.
CPC ........ *B29C 44/585* (2013.01); *B29C 44/0461* (2013.01); *B29C 44/0492* (2013.01);
(Continued)

(58) Field of Classification Search
CPC .............. B29C 44/585; B29C 44/0461; B29C 44/0492; B29C 44/086; B29C 44/445;
(Continued)

(56) References Cited

U.S. PATENT DOCUMENTS 5,188,899 A    2/1993    Matsumoto et al.

FOREIGN PATENT DOCUMENTS

| DE | 42 37 239 A1 | 5/1994 |
| DE | 690 21 351 T2 | 2/1996 |

(Continued)

OTHER PUBLICATIONS

International Search Report in International Application No. PCT/EP2021/063481, dated Aug. 20, 2021 (wth English translation).
(Continued)

*Primary Examiner* — Christina A Johnson
*Assistant Examiner* — Xue H Liu
(74) *Attorney, Agent, or Firm* — Greenblum & Bernstein, P.L.C.

(57) ABSTRACT

Mold for processing expandable or expanded plastic particles for producing a multi-component particle foam component, that includes a mold cavity delimited by mold walls, having at least one mold element, which in particular is slide-like or slide-shaped, wherein the at least one mold element is mounted so as to be movable between a first orientation and/or position and at least one further orientation and/or position in which it projects at least in portions into the mold cavity, and wherein the at least one mold element is designed with, or has, a flow channel structure having at least one flow channel which extends inside the mold element and through which a process fluid can flow.

18 Claims, 8 Drawing Sheets

(51) Int. Cl.
*B29C 44/08* (2006.01)
*B29C 44/44* (2006.01)
*B29K 23/00* (2006.01)
*B29K 25/00* (2006.01)
*B33Y 80/00* (2015.01)

(52) U.S. Cl.
CPC .......... *B29C 44/086* (2013.01); *B29C 44/445* (2013.01); *B29K 2023/12* (2013.01); *B29K 2025/06* (2013.01); *B33Y 80/00* (2014.12)

(58) Field of Classification Search
CPC . B33Y 80/00; B29K 2023/12; B29K 2025/06
See application file for complete search history.

(56) References Cited

FOREIGN PATENT DOCUMENTS

| | | |
|---|---|---|
| DE | 102018007301 A1 | 10/2019 |
| EP | 0 433 727 A1 | 6/1991 |
| EP | 2875928 A1 | 5/2015 |
| GB | 1 139 020 A | 1/1969 |
| JP | S61130026 A | 6/1986 |
| JP | H03-223333 A | 10/1991 |
| JP | H4-267135 A | 9/1992 |
| JP | H6-170962 A | 6/1994 |
| JP | 2992591 B2 | 12/1999 |
| JP | 2012020420 A | 2/2012 |
| KR | 910011632 A | 8/1991 |

OTHER PUBLICATIONS

Written Opinion (English translation) in International Application No. PCT/EP2021/063481, dated Aug. 20, 2021.

MOLD FOR PROCESSING EXPANDABLE OR EXPANDED PLASTIC PARTICLES

The invention relates to a mold for processing expandable or expanded plastic particles for producing a multi-component particle foam component, and to a method for processing expandable or expanded plastic particles for producing a multi-component particle foam component.

The production of multi-component particle foam components, i.e. particle foam components which consist of at least two expandable or expanded particle foam materials which differ in at least one chemical parameter and/or physical parameter, is known in principle from the prior art. Corresponding particle foam components are characterized by locally different structural properties, such that their property profile is of significant interest for different fields of application or use.

However, the molds and methods used to date require improvement in view of facility and process-related aspects. This applies in particular for implementing efficient and reproducible production of high-quality multi-component particle foam components.

The object of the invention is to specify a mold that is improved in comparison therewith, for processing expandable or expanded plastic particles for producing a multi-component particle foam component, and to a method for processing expandable or expanded plastic particles for producing a multi-component particle foam component.

The object is achieved by the subjects of the independent claims, i.e. in particular by a mold according to independent claim 1. The claims dependent thereon relate to possible embodiments of the subjects of the independent claims.

A first aspect of the invention relates to a mold for processing expandable or expanded plastic particles ("plastic particles") of an expandable or expanded plastic particle material ("plastic particle material") for producing a multi-component particle foam component. The mold is thus designed for producing at least one multi-component particle foam component. A multi-component particle foam component is a component which consists of at least two particle foam materials which differ in at least one chemical parameter, such as the chemical composition, and/or physical parameter, such as the density, the particle size, the particle shape, etc. The mold is accordingly designed for producing plastic particles from particle foam materials which differ in at least one chemical parameter and/or physical parameter, in order to produce a multi-component particle foam component. A corresponding multi-component particle foam component thus comprises a first particle foam component region formed by a first molded part, and at least one further particle foam component region formed by at least one further molded part, wherein the first region differs from the at least one further region in at least one chemical parameter and/or physical parameter.

The plastic particles processed by means of the mold can be not yet expanded plastic particles, pre-expanded plastic particle material, or completely expanded plastic particles consisting of one or more plastic particle materials. For not yet expanded plastic particles and for a pre-expanded plastic particle, it is typically the case that these are expandable, i.e. can be expanded (further) in an expansion process, for example thermally induced by a temperature-controlled process fluid. The connection of the plastic particles taking place in the context of processing corresponding plastic particles, forming the particle foam component, is typically associated with a corresponding (further) expansion process of the plastic particles. For completely expanded plastic particles, it is typically the case that these can no longer be (further) expanded. The connection of the plastic particles taking place in the context of processing corresponding plastic particles, forming the particle foam component, is typically not associated with a corresponding (further) expansion process of the plastic particles.

Specifically, corresponding plastic particles can be e.g. plastic particles made of a plastic particle material based on polyolefins, i.e. in particular polypropylene, based on thermoplastic elastomers, i.e. in particular thermoplastic polyurethane, or based on polystyrene.

The plastic particles processed by means of the mold are typically not interconnected prior to being processed by means of the mold, the plastic particles which can be processed by means of the mold are thus typically present as loose particles prior to being processed by the mold, i.e. for example as particulate filling material, and are accordingly introduced into the mold, as loose particles, via at least one filling device of the mold.

The mold can be formed in one piece or in multiple parts. In the multi-part design of the mold, this comprises at least two mold bodies, optionally also to be referred to or considered mold halves.

The mold or respective mold bodies comprise(s) at least one mold (body) wall. The at least one mold (body) wall defines a mold cavity. The at least one mold (body) wall can comprise one or more mold (body) wall portions. The mold (body) wall portions can be arranged or formed so as to extend in at least one spatial plane and/or direction. The at least one mold (body) wall can accordingly be arranged or formed for example so as to be flat or inclined or bent or curved, at least in portions.

The at least one mold (body) wall can be provided at least in portions with a plurality of openings which are in particular in the form or shape of drilled holes, or are nozzle-like or nozzle-shaped. For example a process fluid, such as steam or superheated steam, can be introduced into the mold cavity via corresponding openings—specifically these can be designed for example in a slit-like or slit-shaped manner. Alternatively or in addition, a particular pressure level, such as an excess or negative pressure, can be generated or maintained in the mold cavity, via corresponding openings.

The mold cavity, i.e. in particular respective partial volumes of the mold cavity which will explained in greater detail in the following, can be filled successively with plastic particles processed by the mold, via filling devices associated with the mold. A plurality of filling devices is typically associated with the mold, via which the mold cavity can be filled with plastic particles made of plastic particle materials which differ in at least one chemical parameter, such as the chemical composition, and/or physical parameter, such as the density, the particle size, the particle shape, etc. For example, the mold cavity, i.e. in particular a first partial volume of the mold cavity, can be fillable or filled with plastic particles from a first plastic particle material, via a first filling device, and the mold cavity, i.e. in particular a further or second partial volume of the mold cavity, can be fillable or filled with further plastic particles from a further or second plastic particle material which differs from the first plastic particle material in at least one chemical parameter and/or physical parameter, via at least one further filling device.

Corresponding filling devices can be designed to generate an in particular pressurized conveying flow, by means of which the plastic particles with which the mold cavity is to be filled can be conveyed into the mold cavity. Corresponding filling devices typically comprise at least one flow generation means for generating a corresponding conveying flow, and at least one in particular tube-like or tube-shaped conveying element which defines a conveying stretch that opens into the mold cavity. Of course, differently designed filling devices are conceivable. Merely by way of example reference is made, in this connection, to filling devices, which allow for (largely) unpressurized conveying of plastic particles, and thus a (largely) unpressurized filling of the mold cavity.

The mold comprises at least one slide-like or slide-shaped mold element.

A first functionality of the at least one mold element consists in occupying, and releasing, as required, at least a partial volume of the mold cavity. For this purpose, the at least one mold element can be moved into a first orientation and/or position and into at least one further orientation and/or position. Accordingly, the at least one mold element is mounted so as to be movable between a first orientation and/or position and at least one further orientation and/or position which is different from the first orientation and/or position. The at least one mold element is thus mounted so as to be movable in at least one translational and/or rotatory degree of freedom of movement, and can accordingly be transferred into the first orientation and/or position and into the at least one further orientation and/or position by movements along at least one translational and/or rotatory movement path—in this case combined movement paths in at least two different degrees of freedom of movement are also conceivable, such that for example screw-like or helical movement paths are conceivable. Specific examples for corresponding degrees of freedom of movement or movement paths are linear degrees of freedom of movement or movement paths along a linear movement axis, or degrees of freedom of pivot movement or pivot movement paths about a pivot axis.

With respect to the first orientation and/or position of the at least one mold element and the at least one further orientation and/or position of the at least one mold element, various variants are conceivable, irrespective of the specific type of movement:

In a first variant, by way of example, the at least one mold element cannot project into the mold cavity in the first orientation and/or position, wherein it projects into the mold cavity to a certain extent in the at least one further orientation and/or position. The at least one mold element is thus moved into the mold cavity by a certain path distance in the at least one further orientation and/or position, compared with the first orientation and/or position. The first orientation and/or position of the at least one mold element can therefore be correlated with a retracted state of the at least one mold element, and the at least one further orientation and/or position of the at least one mold element can be correlated with an extended state of the at least one mold element. In the first orientation and/or position, the at least one mold element can thus end flush with a mold (body) wall defining the mold cavity, in particular with a free end facing the mold cavity. In the further orientation and/or position, the at least one mold element can project into the mold cavity, and thus also beyond the corresponding mold (body) wall into the mold cavity, by a certain amount compared with the first orientation and/or position, such that at least one mold element occupies a further partial volume of the mold cavity in the further orientation and/or position.

In a second variant, by way of example, the at least one mold element can project into the mold cavity by a first amount, in the first orientation and/or position, wherein it projects into the mold cavity by a further amount, different from the first amount, in the further orientation and/or position. Thus, in the first orientation and/or position, the at least one mold element is moved into the mold cavity by a certain first path distance, and in the at least one further orientation and/or position it is moved into the mold cavity by a certain further path distance, compared with the first orientation and/or position. Here, too, the first orientation and/or position of the at least one mold element can be correlated with a (further) retracted state of the at least one mold element, and the further orientation and/or position of the at least one mold element can be correlated with a (further) extended state of the at least one mold element. In the first orientation and/or position, the at least one mold element can project into the mold cavity by a first amount or a first path distance, in particular with a free end facing the mold cavity, and thus also project beyond a mold (body) wall, into the mold cavity, by a first amount or a first path distance, such that the at least one mold element occupies a first partial volume of the mold cavity in the first orientation and/or position. In the further orientation and/or position, the at least one mold element can project into the mold cavity by a further amount or a further path distance compared with the first orientation and/or position, and thus also project beyond the corresponding mold (body) wall, into the mold cavity, by a further amount or a further path distance, such that at least one mold element occupies a further partial volume of the mold cavity in the further orientation and/or position. The further amount or the further path distance is typically larger than the first amount or the first path distance, respectively.

As is clear in the following it is in principle possible that the at least one mold element can additionally be moved into at least one orientation and/or position located between respective first and further orientations and/or positions.

In order to transfer the at least one mold element into respective orientations and/or positions, the at least one mold element is typically associated with at least one drive means. A corresponding drive means is designed for generating a drive force and/or a drive torque, by means of which the at least one mold element can be moved into respective orientations and/or positions. A corresponding drive means can be for example a hydraulic or pneumatic drive means. A corresponding drive means can comprise at least one hydraulic or pneumatic drive means, which can be or is coupled to the at least one mold element. Alternatively or in addition a corresponding drive means can be an (electric) motor-operated drive means. A corresponding drive means can comprise at least one (electric) motor-operated drive element, which can be or is coupled to the at least one mold element.

A second functionality of the at least one mold element consists in introducing a process fluid, such as steam or superheated steam, into the mold cavity, as required, during operation of the mold. For this purpose, the at least one mold element is designed with, or comprises, a flow channel structure having at least one flow channel which extends inside the mold element and through which a process fluid can flow. A corresponding flow channel thus extends in at least one spatial direction and/or spatial plane, between an inflow opening, via which a process fluid can flow into the flow channel or into the flow channel structure, and at least one outflow opening, via which a process fluid can flow out of the flow channel or out of the flow channel structure and into the mold cavity, via the at least one mold element. As can be seen in the following, the flow channel structure can comprise a plurality of flow channels. The flow channels can be designed so as to communicate with one another, or so as not to communicate with one another.

The at least one mold element is thus typically designed with, or comprises, at least one, in particular nozzle-like or nozzle-shaped, outflow opening (flow opening), via which a process fluid flowing through the at least one flow channel or the flow channel structure can flow out of the at least one mold element and into the mold cavity.

As can be seen in the following, a corresponding outflow of process fluid out of the at least one flow channel or the flow channel structure into the mold cavity takes place in particular if the at least one mold element is moved into a corresponding first orientation and/or position, and/or in particular a corresponding further orientation and/or position.

The design of the at least one mold element allows for efficient and reproducible production of high-quality multi-component particle foam components, such that an improved mold for processing plastic particles for producing multi-component particle foam components is provided.

The at least one mold element, in particular the at least one flow channel structure, is formed or manufactured at least in portions, optionally completely, in an additive manufacturing method. The formation or manufacture of the at least one mold element, in particular the flow channel structure, at least in portions, optionally fully additively, allows for the formation of flow channel arrangements and geometries which are optimized in particular with respect to undesired energy losses, i.e. in particular pressure and/or temperature losses, which arrangements and geometries cannot be achieved by conventional manufacturing methods. In particular, highly filigreed flow channel arrangements and geometries can be achieved, which can be implemented using conventional manufacturing methods. Since the at least one mold element, and, furthermore, the entire mold, is typically a metal component, in particular additive manufacturing methods, which allow for metal components to be produced, are possible for forming or manufacturing the at least one mold element. Merely by way of example, reference is made in this connection to selective electron beam or laser sintering methods, selective electron beam or laser melting methods, and metal binder jetting methods. However, additive manufacturing methods not based on a powder bed, such as FFF or FDM methods, are also conceivable.

In principle, it is possible for the at least one mold element to be manufactured entirely in an additive manner. If only the flow channel structure is manufactured additively, this can be received, for example as an insert element, in a main body of the at least one mold element that is provided with a receiving possibility for the flow channel structure. It is also conceivable for the flow channel to be constructed additively, in the sense of a hybrid component, on a main body of the mold element.

The flow channel structure can comprise at least one encompassing grid structure formed by a plurality of structural elements arranged or formed in a grid-like or grid-shaped manner. Corresponding structural elements can be designed for example in a strut-like or strut-shaped manner. The grid structure can define a plurality of subspaces which communicate with one another. The grid structure can be formed so as to extend through the at least one mold element, in at least one spatial plane and/or spatial direction, and therefore typically assumes a particular spatial volume of the at least one mold element. The grid structure can in particular be arranged or formed in the region of a free end of the at least one mold element facing the mold cavity, and can communicate with outflow openings that are arranged or formed in particular in the region of a free end facing the mold cavity. The grid structure can be arranged or formed so as to extend at least in portions, in particular completely, over the cross section of the at least one mold element, and can thus serve as a distributor structure for distributing a process fluid, flowing through the at least one mold element, over the cross section of the at least one mold element. The grid structure can in particular be formed or manufactured in an additive manufacturing method.

As mentioned, the at least one mold element is designed with, or comprises, at least one, in particular nozzle-like or nozzle-shaped, outflow opening (flow opening), via which a process fluid flowing through the flow channel structure can flow out of the at least one mold element and into the mold cavity. In particular, it is possible for the at least one mold element to be provided with a plurality of outflow openings which are arranged or formed so as to extend over the entire cross section of the at least one mold element, such that an outflow of a process fluid is possible over the entire cross section of the at least one mold element. It is also conceivable for different outflow regions to be defined, via which a process fluid can flow out in a manner dependent on or independent from one another. This can be achieved for example in that a first number of outflow openings—these can for example form a first array of outflow openings—is associated with at least one first flow channel, such that a first process fluid flowing through the first flow channel can flow out into the mold cavity via the first number of outflow openings, and at least one further number of outflow openings—these can for example for a further array of outflow openings—is associated with at least one further flow channel, such that a further process fluid flowing through the further flow channel can flow out into the mold cavity via the further number of outflow openings. A corresponding first process fluid can differ from a corresponding further process fluid in at least one chemical parameter, such as the chemical composition, and/or physical parameter, such as the pressure, the temperature, etc.

The flow channel structure of the at least one mold element can connectable or connected to its own process fluid supply device, which can in particular be operated independently of a process fluid supply device of the mold cavity—this can for example be a vapor chamber. The process fluid—this can for example be steam or superheated steam—which can flow into the mold cavity via the at least one mold element can thus be provided and introduced into the mold cavity as required, independently of the process fluid flowing into the mold cavity via respective openings on the mold (body) wall side.

The at least one mold element can comprise at least one receiving region for receiving a free end of a filling device projecting into the mold cavity, in particular a filling device for filling the mold cavity with plastic particles from a further or second plastic particle material which differs from a first plastic particle material in at least one chemical parameter and/or physical parameter. A corresponding receiving region can be formed for example by a recess or depression in the at least one mold element, i.e. in particular in a free end of the at least one mold element facing the mold cavity. A corresponding receiving region is designed to interact with a corresponding filling device, i.e. in particular a free end of a tube-like or tube-shaped conveying element of the filling device that projects into the mold cavity, such that the free end of the conveying element, typically provided with at least one opening for the outflow of plastic particles, plunges into the receiving region in a sealing manner, by a certain amount, and thus the at least one mold element surrounds the at least one opening in a sealing manner, at least in portions. This interaction is in particular implemented when the at least one mold element is moved into the further orientation and/or position. The same could be achieved by sealing contact of the conveying element on the at least one mold element.

All the above statements in connection with the at least one mold element apply analogously for embodiments of the mold having a plurality of correspondingly designed mold elements.

As is clear in the following, a function of the at least one mold element, during operation of the mold, consists in particular in delimiting or defining, as required, partial volumes of the mold cavity, by means of corresponding movements, which partial volumes can be filled with plastic particles as required.

The mold can be assigned a controller, implemented by hardware and/or software, for controlling movements of the at least one mold element from the first orientation and/or position into the at least one further or second orientation and/or position, and vice versa. The controller is correspondingly designed to generate control information for controlling the operation of at least one drive means associated with the at least one mold element, in order to move the at least one mold element into the further or second orientation and/or position. The drive means can correspondingly be operated on the basis of the control information. The controller can in particular be designed to move the at least one mold element, prior to the mold cavity being filled with plastic particles from a first plastic particle material, into the further or second orientation and/or position. This can be achieved in particular such that a first partial volume of the mold cavity which can be filled with plastic particles from a first plastic particle material is delimited or defined by the mold (body) walls and the at least one mold element moved into the further or second orientation and/or position. The first partial volume of the mold cavity, which can be filled with plastic particles from the first plastic particle material, is typically reduced by a first amount compared with the volume of the mold cavity which can be filled with plastic particle material in the first orientation and/or position of the at least one mold element.

The mold can furthermore be associated with a controller, implemented by hardware and/or software, for controlling filling processes for filling the mold cavity, i.e. in particular the first partial volume of the mold cavity, with plastic particles from a first plastic particle material. The controller is correspondingly designed for generating control information for controlling the operation of at least one filling device associated with the mold, in particular a first filling device, for filling the mold cavity, i.e. in particular the first partial volume of the mold cavity, with plastic particles from a first plastic particle material, in order to carry out filling processes for filling the mold cavity, i.e. in particular the first partial volume of the mold cavity, with plastic particles from a first plastic particle material. The filling device can correspondingly be operated on the basis of the control information. The controller can in particular be designed to carry out a filling process for filling the first partial volume of the mold cavity with plastic particles from a first plastic particle material, via a filling device, in particular via a first filling device, when the at least one mold element is moved into the further or second orientation and/or position.

The mold can furthermore be associated with a controller, implemented by hardware and/or software, for controlling measures for connecting plastic particles with which the mold cavity is filled. The controller can be designed for carrying out at least one measure for connecting the plastic particles from the first plastic particle material, with which the first partial volume of the mold cavity is filled, forming a first molded part formed of the first plastic particle material, when the first partial volume of the mold cavity is filled with plastic particles from the first plastic particle material. Carrying out the measure for connecting the plastic particles from the first plastic particle material thus results in the formation of a first molded part, consisting of the first plastic particle material, which occupies a partial volume of the mold cavity.

The acquisition of the or a sufficient fill level of the first partial volume of the mold cavity with plastic particles from the first plastic particle material, optionally for example in view of the desired properties of a multi-component particle foam component to be produced, can be performed by a suitable acquisition means for acquiring the fill level of the mold cavity, i.e. in particular of the first partial volume of the mold cavity. A corresponding acquisition means can comprise one or more acquisition elements, in this case these may be for example pressure sensors, the acquisition information of which can be transmitted to the controller.

The measure for connecting the plastic particles from the first plastic particle material, with which the mold cavity is filled, can include an introduction of a temperature-controlled process fluid, in particular steam, into the first partial volume of the mold cavity, in particular via openings on the mold (body) wall side and/or on the mold element side. The controller can thus be designed to control the introduction of a temperature-controlled process fluid into the first partial volume of the mold cavity. In connection with the openings on the mold (body) wall side, the process fluid can be provided for example via a process fluid supply device of the mold cavity that is associated with the mold—said process fluid supply device can be designed for example as a steam chamber. In connection with the openings on the mold element side, the process fluid can, as mentioned, be provided via its own process fluid supply device which can in particular be operated independently of a process fluid supply device of the mold cavity. In particular, it is possible for the measure to be achieved by introducing a process fluid only via openings on the mold (body) wall side.

The controller designed for controlling movements of the at least one mold element can furthermore be designed to move the at least one mold element from the further or second orientation and/or position into the first orientation and/or position, when the measure for connecting the plastic particles from the first plastic particle material is completed. The controller is correspondingly designed to generate control information for controlling the operation of at least one drive means associated with the at least one mold element, in order to move the at least one mold element from the further or second orientation and/or position into the first orientation and/or position. The drive means can correspondingly be operated on the basis of the control information. This can be achieved in particular such that a further or second partial volume of the mold cavity which can be filled with plastic particles from a further or second plastic particle material is delimited or defined by the first molded part and/or the mold (body) wall and/or the at least one mold element moved into the first orientation and/or position.

The acquisition of the completion of the measure for connecting the plastic particles from the first plastic particle material can be achieved by a suitable acquisition means for acquiring the completion of the measure for connecting the plastic particles from the first plastic particle material. A corresponding acquisition means can comprise one or more acquisition elements, in this case these may be for example pressure sensors, the acquisition information of which can be transmitted to the controller.

The controller designed for controlling filling processes of the mold cavity can be designed to carry out a filling process for filling the further or second partial volume of the mold cavity with plastic particles from a further or second plastic particle material which differs from the first plastic particle material in at least one chemical parameter and/or physical parameter, via a filling device, in particular via a further or second filling device for filling the mold cavity with plastic particles from a further or second plastic particle material which differs from the first plastic particle material in at least one chemical parameter and/or physical parameter, when the at least one mold element is moved into the first orientation and/or position. The controller is correspondingly designed for generating control information for controlling the operation of at least one filling device associated with the mold, in particular a further or second filling device, in order to carry out filing processes for filling the mold cavity, i.e. in particular the further or second partial volume of the mold cavity, with plastic particles from a further or second plastic particle material which differs from the first plastic particle material in at least on chemical parameter and/or physical parameter. The filling device can correspondingly be operated on the basis of the control information.

The acquisition of the movement of the at least one mold element into the first orientation and/or position can be achieved via a suitable acquisition means for acquiring movements of the at least one mold element into the first orientation and/or position. A corresponding acquisition means can comprise one or more acquisition elements, in this case these may be for example travel sensors, the acquisition information of which can be transmitted to the controller.

The controller designed for controlling measures for connecting plastic particles with which the mold cavity is filled can be designed for carrying out at least one measure for connecting the plastic particles from the further or second plastic particle material, with which the further or second partial volume of the mold cavity is filled, forming a further second molded part formed of the further or second plastic particle material, when the second partial volume of the mold cavity is filled with plastic particles from the further or second plastic particle material. Carrying out the measure for connecting the plastic particles from the further or second plastic particle material thus results in the formation of a further or second molded part, consisting of the further or second plastic particle material, which occupies a partial volume of the mold cavity. The further or second molded part can be connected to the first molded part, in particular in a form-fitting and/or force-fitting and/or integrally bonded manner, forming the multi-component particle foam component to be produced.

The acquisition of the or a sufficient fill level of the further or second partial volume of the mold cavity with plastic particles from the further or second plastic particle material, optionally for example in view of the desired properties of a multi-component particle foam component to be produced, can be performed by a suitable acquisition means for acquiring the fill level of the mold cavity, i.e. in particular of the further or second partial volume of the mold cavity. A corresponding acquisition means can comprise one or more acquisition elements, in this case these may be for example pressure sensors, the acquisition information of which can be transmitted to the controller.

The measure for connecting the plastic particles from the further or second plastic particle material, with which the mold cavity is filled, can include an introduction of a temperature-controlled process fluid into the further or second partial volume of the mold cavity, in particular via openings on the mold (body) wall side and/or on the mold element side. In connection with the openings on the mold (body) wall side, the process fluid can be provided for example via a process fluid supply device of the mold cavity that is associated with the mold—said process fluid supply device can be designed for example as a steam chamber. In connection with the openings on the mold element side, the process fluid can, as mentioned, be provided via its own process fluid supply device which can in particular be operated independently of a process fluid supply device of the mold cavity. In particular, it is possible for the measure to be achieved by introducing a process fluid only via the outflow openings on the mold element side.

The mold can furthermore be associated with a controller, implemented by hardware and/or software, for controlling measures for evacuating and/or cooling the mold cavity. The controller can be designed to carry out a measure for evacuating and/or cooling the mold cavity via a device for evacuating and/or cooling the mold cavity, when the measure for connecting the plastic particles from the second plastic particle material, with which the mold cavity is filled, is completed. The evacuation and/or cooling of the mold cavity can take place for example via individual, a plurality of or all the openings on the mold (body) wall side and/or outflow openings on the mold element side.

The acquisition of the completion of the measure for connecting the plastic particles from the further or second plastic particle material can be achieved by a suitable acquisition means for acquiring the completion of the measure for connecting the plastic particles from the second plastic particle material. A corresponding acquisition means can comprise one or more acquisition elements, in this case these may be for example pressure sensors, the acquisition information of which can be transmitted to the controller.

The following explanations show that three-component or multi-component particle foam components can also be produced using the mold:

In this case, the controller designed for controlling movements of the at least one mold element can be designed to move the at least one mold element from the or a second orientation and/or position into a further or third orientation and/or position, when the measure, carried out as explained above, for connecting the plastic particles from the first plastic particle material is completed. The controller is correspondingly designed to generate control information for controlling the operation of at least one drive means associated with the at least one mold element, in order to move the at least one mold element into the further or third orientation and/or position. The drive means can correspondingly be operated on the basis of the control information. This can be achieved in particular such that a second partial volume of the mold cavity which can be filled with plastic particles from a second plastic particle material is delimited or defined by the first molded part and/or the mold (body) wall and/or the at least one mold element moved into the further or third orientation and/or position.

The controller designed for controlling filling processes of the mold cavity can be designed to carry out a filling process for filling the second partial volume of the mold cavity with plastic particles from a second plastic particle material which differs from the first plastic particle material in at least one chemical parameter and/or physical parameter, via a filling device, in particular via a second filling device for filling the mold cavity with plastic particles from a second plastic particle material which differs from the first plastic particle material in at least one chemical parameter and/or physical parameter, when the at least one mold element is moved into the second orientation and/or position. The controller is correspondingly designed for generating control information for controlling the operation of at least one filling device associated with the mold, in particular a further or second filling device, in order to carry out filing processes for filling the second partial volume of the mold cavity with plastic particles from a second plastic particle material which differs from the first plastic particle material in at least one chemical parameter and/or physical parameter. The filling device can correspondingly be operated on the basis of the control information.

The controller designed for controlling measures for connecting plastic particles with which the mold cavity is filled can be designed for carrying out at least one measure for connecting the plastic particles from the second plastic particle material, with which the second partial volume is filled, forming a second molded part formed of the second plastic particle material, when the second partial volume of the mold cavity is filled with plastic particles from the second plastic particle material. Carrying out the measure for connecting the plastic particles from the second plastic particle material thus results in the formation of a second molded part, consisting of the second plastic particle material, which occupies a partial volume of the mold cavity. The second molded part can be connected to the first molded part, in particular in a form-fitting and/or force-fitting and/or integrally bonded manner.

The measure for connecting the plastic particles from the second plastic particle material, with which the mold cavity is filled, can include an introduction of a temperature-controlled process fluid into the second partial volume of the mold cavity, in particular via openings on the mold (body) wall side and/or on the mold element side.

In this case, the controller designed for controlling movements of the at least one mold element can furthermore be designed to move the at least one mold element from the further or third orientation and/or position into the first orientation and/or position, when the measure for connecting the plastic particles from the second plastic particle material is completed. The controller is correspondingly designed to generate control information for controlling the operation of at least one drive means associated with the at least one mold element, in order to move the at least one mold element from the further or third orientation and/or position into the first orientation and/or position. The drive means can correspondingly be operated on the basis of the control information. This can be achieved in particular such that a further or third partial volume of the mold cavity which can be filled with plastic particles from a further or second plastic particle material is delimited or defined by the first molded part and/or the second molded part and/or the mold (body) wall and/or the at least one mold element moved into the further or third orientation and/or position.

The controller designed for controlling filling processes of the mold cavity can be designed to carry out a filling process for filling the further or third partial volume of the mold cavity with plastic particles from a further or third plastic particle material which differs from the first plastic particle material and/or the second plastic particle material in at least one chemical parameter and/or physical parameter, via a filling device, in particular via a further or third filling device for filling the mold cavity, i.e. in particular the further or third partial volume of the mold cavity, with plastic particles from a further or third plastic particle material which differs from the first plastic particle material and/or the second plastic particle material in at least one chemical parameter and/or physical parameter, when the at least one mold element is moved into the first orientation and/or position. The controller is correspondingly designed for generating control information for controlling the operation of at least one filling device associated with the mold, in particular a further or third filling device, in order to carry out filing processes for filling the mold cavity, i.e. in particular the further or third partial volume of the mold cavity, with plastic particles from a further or third plastic particle material which differs from the first plastic particle material and/or the second plastic particle material in at least one chemical parameter and/or physical parameter. The filling device can correspondingly be operated on the basis of the control information.

The controller designed for controlling measures for connecting plastic particles with which the mold cavity is filled can be designed for carrying out at least one measure for connecting the plastic particles from the further or third plastic particle material, with which the further or third partial volume is filled, forming a further or third molded part formed of the further or third plastic particle material, when the further or third partial volume of the mold cavity is filled with plastic particles from the further or third plastic particle material. Carrying out the measure for connecting the plastic particles from the further or third plastic particle material thus results in the formation of a further or third molded part, consisting of the further or third plastic particle material, which occupies a partial volume of the mold cavity. The further or third molded part can be connected to the first molded part and/or the second molded part, in particular in a form-fitting and/or force-fitting and/or integrally bonded manner, forming the multi-component particle foam component to be produced.

The measure for connecting the plastic particles from the further or third plastic particle material, with which the mold cavity is filled, can include an introduction of a temperature-controlled process fluid into the further or third partial volume of the mold cavity, in particular via openings on the mold (body) wall side and/or on the mold element side.

The mold can in turn be associated with a controller, implemented by hardware and/or software, for controlling measures for evacuating and/or cooling the mold cavity. The controller is correspondingly designed to carry out a measure for evacuating and/or cooling the mold cavity via a device for evacuating and/or cooling the mold cavity, when the measure for connecting the plastic particles from the further or third plastic particle material, with which the mold cavity is filled, is completed.

For all embodiments, it is the case that the geometric/constructional design of the at least one mold element is typically selected in a manner dependent on the application. In addition to comparatively simple geometric/constructional designs, such as cube-like or cube-shaped, cylinder-like or cylinder-shaped designs, more complex geometric/constructional designs, such as spiral-like or spiral-shaped, or coil-like or coil-shaped, designs are also conceivable. In principle, free form designs which cannot be clearly defined in geometric terms are also conceivable.

For all embodiments, it is furthermore the case that the at least one mold element is typically mounted in a receptacle or bearing for this, on the mold side. The mold can thus be equipped with at least one receiving or bearing portion, for example in the form or shape of drilled holes. In this case, these can specifically be for example bearing bores, into which a corresponding mold element can be inserted, in particular in an exactly fitting manner.

For all embodiments, it is furthermore the case that individual, a plurality of, or all of the above-mentioned controllers can be hardware and/or software components of a higher-level controller, in particular a higher-level controller for controlling the operation of the mold.

For all embodiments, it is furthermore the case that individual, a plurality of, or all of the above-mentioned acquisition means can be hardware and/or software components of a higher-level acquisition means.

As mentioned, the mold can comprise a plurality of mold elements which are correspondingly mounted so as to be movable between a first orientation and/or position and at least one further orientation and/or position. In this case, at least two mold elements can extend in parallel with one another or not in parallel with one another, into the mold cavity, in the respective orientations and/or positions thereof. Therefore, at least two mold elements can extend from the same or different mold (body) walls, into the mold cavity, in the respective further orientations and/or positions thereof.

A second aspect of the invention relates to a mold element for a mold according to the first aspect of the invention. The typically slide-like or slide-shaped mold element is mounted so as to be movable between a first orientation and/or position and at least one further orientation and/or position, and is designed with, or comprises, a flow channel structure having at least one flow channel which extends inside the mold element and through which a process fluid can flow.

A third aspect of the invention relates to a device, which can also be referred to as an automatic molded part machine, for processing expandable or expanded plastic particles producing a multi-component particle foam component. The device comprises at least one mold according to the first aspect of the invention, at least one filling device for filling the mold cavity of the mold with plastic particles from a plastic particle material, at least one drive means for generating a drive force and/or a drive torque, via which the at least one mold element can be moved into the respective orientations and/or positions, and at least one process fluid supply device for supplying the mold cavity with a process fluid.

A fourth aspect of the invention relates to a method for processing expandable or expanded plastic particles producing a multi-component particle foam component. In order to carry out the method, a mold according to the first aspect of the invention and/or a mold element according to the second aspect of the invention and/or a device according to the third aspect of the invention is used.

The method in particular includes the movements of the at least one mold element explained in connection with the operation of the mold for producing a multi-component particle foam component, the filling processes of respective partial volumes of the mold cavity created by corresponding movements of the at least one mold element, the connection processes for connecting respective plastic particles with which respective partial volumes of the mold cavity are filled.

All the statements made in connection with the mold apply analogously to the mold element and/or to the device and/or to the method.

The invention will be explained in greater detail, with reference to embodiments shown in the drawings, in which:

FIG. 1-6 are each schematic views of a mold 1 according to a first embodiment.

Figure 1:
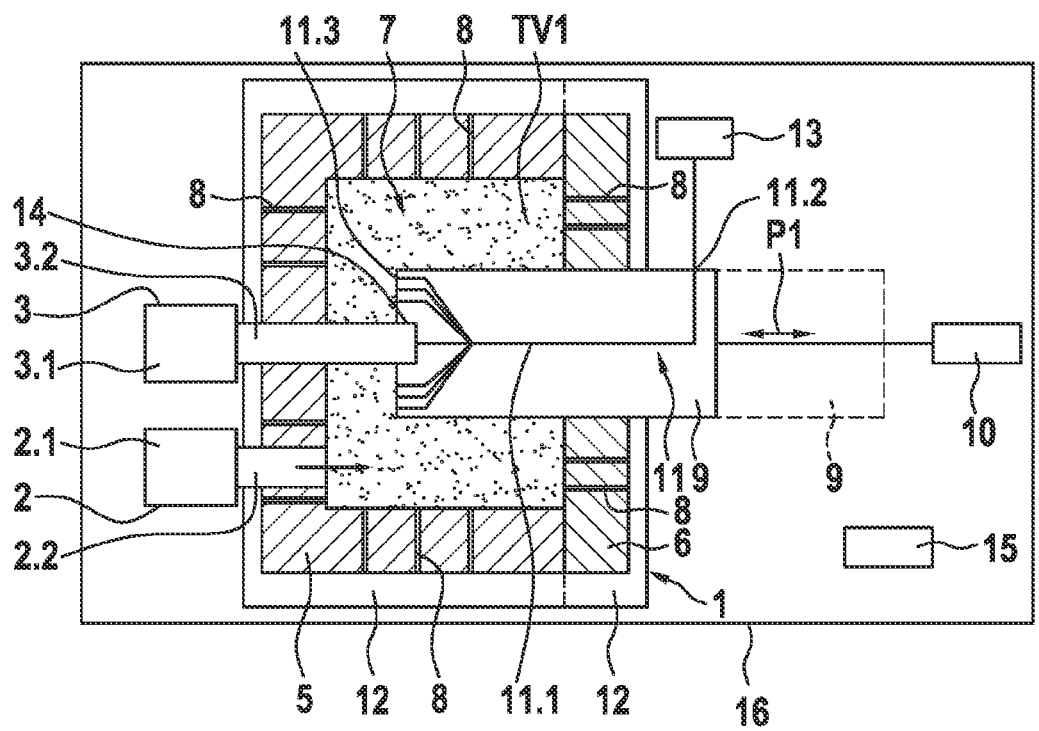
FIG. 1-6 are each schematic views of a mold according to a first embodiment.

The mold 1 is designed for processing expandable or expanded plastic particles ("plastic particles") of an expandable or expanded plastic particle material ("plastic particle material") for producing a multi-component particle foam component. The mold 1 is accordingly designed for producing plastic particles from particle foam materials which differ in at least one chemical parameter and/or physical parameter, in order to produce a multi-component particle foam component. A corresponding multi-component particle foam component thus comprises a first particle foam component region formed by a first molded part, and at least one further particle foam component region formed by at least one further molded part, wherein the first region differs from the at least one further region in at least one chemical parameter and/or physical parameter.

The plastic particles processed by means of the mold can be not yet expanded plastic particles, pre-expanded plastic particle material, or completely expanded plastic particles consisting of one or more plastic particle materials. For not yet expanded plastic particles and for a pre-expanded plastic particle, it is typically the case that these are expandable, i.e. can be expanded (further) in an expansion process, for example thermally induced by a temperature-controlled process fluid. The connection of the plastic particles taking place in the context of processing corresponding plastic particles, forming the particle foam component, is typically associated with a corresponding (further) expansion process of the plastic particles. For completely expanded plastic particles, it is typically the case that these can no longer be (further) expanded. The connection of the plastic particles taking place in the context of processing corresponding plastic particles, forming the particle foam component, is typically not associated with a corresponding (further) expansion process of the plastic particles.

Specifically, corresponding plastic particles can be e.g. plastic particles made of a plastic particle material based on polyolefins, i.e. in particular polypropylene, based on thermoplastic elastomers, i.e. in particular thermoplastic polyurethane, or based on polystyrene.

The plastic particles processed by means of the mold 1 are typically not interconnected prior to being processed; the plastic particles which can be processed by means of the mold 1 are thus typically present as loose particles prior to being processed, i.e. for example as particulate filling material, and are accordingly introduced into the mold 1, as loose particles, via at least one filling device 2, 3, 4 of the mold 1.

The mold 1 is formed in multiple parts in figures and comprises, by way of example, at least two mold bodies 5, 6, optionally also to be referred to or considered mold halves. The left-hand mold body 5 in the figures has, in any case in a cut-away view, by way of example a U-shaped geometric/constructional shape, the right-hand mold body 6 in the figures has, in any case in a cut-away view, by way of example a plate-shaped geometric/constructional shape. The mold bodies 5, 6 are typically mounted so as to be movable relative to one another, between an open position and the closed position shown in the figures.

The mold 1 or the mold bodies 5, 6 comprises or comprise mold (body) walls (not denoted in further detail), which define the mold cavity 7 of the mold 1.

The mold bodies 5, 6 are in each case provided with a plurality of openings 8 which are in particular in the form or shape of drilled holes, or are nozzle-like or nozzle-shaped. For example a process fluid, such as steam or superheated steam, can be introduced into the mold cavity 7 via the openings 8—specifically these can be designed for example in a slit-like or slit-shaped manner. Alternatively or in addition, a particular pressure level, such as an excess or negative pressure, can be generated or maintained in the mold cavity 7, via corresponding openings 8.

The mold cavity 7, i.e. in particular certain partial volumes TV1-TV3 of the mold cavity 7, can be filled successively, via the above-mentioned filling devices 2-4, with plastic particles, which are to be processed by means of the mold 1 and which are from plastic particle materials which differ in at least one chemical parameter and/or physical parameter. A plurality of filling devices 2-4 is associated with the mold 1, via which the mold cavity 7 can be filled with plastic particles from plastic particle materials which differ in at least one chemical parameter and/or physical parameter. In the embodiment shown in FIG. 1-6, the mold cavity 7 can be fillable or filled with plastic particles from a first plastic particle material, via a first filling device 2, and the mold cavity 7 can be or is filled with further plastic particles from a further or second plastic particle material which differs from the first plastic particle material in at least one chemical parameter and/or physical parameter, via a second filling device 3.

The filling devices 2-4 can be designed to generate an in particular pressurized conveying flow, by means of which the plastic particles with which the mold cavity 7 is to be filled can be conveyed into the mold cavity 7. For this purpose, the filling devices 2-4 can comprise a flow generation means 2.1, 3.1, 4.1 for generating a corresponding conveying flow, and an in particular tube-like or tube-shaped conveying element 2.2, 3.2, 4.2 which defines a conveying stretch that opens into the mold cavity 7. Filling devices 2-4 of different designs are conceivable. Merely by way of example reference is made, in this connection, to filling devices 2-4, which allow for (largely) unpressurized conveying of plastic particles, and thus a (largely) unpressurized filling of the mold cavity 7.

The mold 1 comprises a slide-like or slide-shaped mold element 9.

A first functionality of the mold element 9 consists in occupying, and releasing, as required, at least a partial volume of the mold cavity 7. For this purpose, the mold element 9 can be moved into a first orientation and/or position, shown in dashed lines in FIG. 1, and into a further or second orientation and/or position shown in FIG. 1. Accordingly, the mold element 9 is mounted so as to be movable between a first orientation and/or position and at least one further or second orientation and/or position which is different from the first orientation and/or position. For this purpose, as indicated purely schematically by the double arrow P1, the mold element 9 is mounted so as to be movable in at least one translational and/or rotatory degree of freedom of movement, and can accordingly be transferred into the first orientation and/or position and into the further or second orientation and/or position by movements along at least one translational and/or rotatory movement path—in this case combined movement paths in at least two combined degrees of freedom of movement are also conceivable. Specific examples for corresponding degrees of freedom of movement or movement paths are, as shown by way of example in the embodiments according to FIG. 1-6, linear degrees of freedom of movement or movement paths along a linear movement axis.

With respect to the first orientation and/or position of the mold element 9 and the at least one further or second orientation and/or position of the mold element 9, various variants are conceivable, irrespective of the specific type of movement:

In a first variant, by way of example, shown in FIG. 1-6, the mold element 9 does not project into the mold cavity 7 in the first orientation and/or position, wherein it projects into the mold cavity 7 by a certain amount in the further or second orientation and/or position. The mold element 9 is thus moved into the mold cavity 7 by a certain path distance in the further or second orientation and/or position, compared with the first orientation and/or position. The first orientation and/or position of the mold element 9 is therefore correlated with a retracted state of the mold element 9, and the further or second orientation and/or position of the mold element 9 is correlated with an extended state of the mold element 9. In the first orientation and/or position, the mold element 9 can thus end flush with a mold (body) wall defining the mold cavity 7, in particular with a free end facing the mold cavity 7. In the further or second orientation and/or position, the mold element 9 can project into the mold cavity 7, and thus also beyond the corresponding mold (body) wall, into the mold cavity 7, by a certain amount compared with the first orientation and/or position, such that the mold element 9 occupies a further partial volume of the mold cavity 7 in the further or second orientation and/or position.

In a second variant, by way of example, not shown in FIG. 1-6, the mold element 9 can project into the mold cavity 7 by a first amount, in the first orientation and/or position, wherein it projects into the mold cavity 7 by a further amount, different from the first amount, in the further or second orientation and/or position. Thus, in the first orientation and/or position, the mold element 9 is moved into the mold cavity 7 by a certain first path distance, and in the further or second orientation and/or position it is moved into the mold cavity 7 by a certain further path distance, compared with the first orientation and/or position. Here, too, the first orientation and/or position of the mold element 9 can be correlated with a (further) retracted state of the mold element 9, and the further or second orientation and/or position of the mold element 9 can be correlated with a (further) extended state of the mold element 7. In the first orientation and/or position, the mold element 9 can project into the mold cavity 7 by a first amount, in particular with a free end facing the mold cavity 7, and thus also project beyond a mold (body) wall, into the mold cavity 7, by a first amount, such that the mold element 9 occupies a first partial volume of the mold cavity 7 in the first orientation and/or position. In the further or second orientation and/or position, the mold element 9 can project into the mold cavity 7 by a further or second amount compared with the first orientation and/or position, and thus also project beyond the corresponding mold (body) wall, into the mold cavity 7, by a further amount, such that the mold element 9 occupies a further partial volume of the mold cavity 7 in the further or second orientation and/or position.

In order to transfer the mold element 9 into respective orientations and/or positions, the mold element 9 is associated with a drive means 10. The drive means 10 is designed for generating a drive force and/or a drive torque, by means of which the mold element 9 can be moved into respective orientations and/or positions. The drive means 10 can be for example a hydraulic or pneumatic drive means. The drive means 10 can thus comprise at least one hydraulic or pneumatic drive means (not shown), which can be or is coupled to the mold element 9. Alternatively or in addition the drive means 10 can be an (electric) motor-operated drive means. A corresponding drive means can comprise at least one (electric) motor-operated drive element, which can be or is coupled to the mold element 9.

A second functionality of the mold element 9 consists in introducing a process fluid, such as steam or superheated steam, into the mold cavity 7, as required, during operation of the mold 1. For this purpose, the mold element 9 is designed with, or comprises, a flow channel structure 11 having at least one flow channel 11.1 which extends inside the mold element 9 and through which a process fluid can flow. A corresponding flow channel 11.1 thus extends in at least one spatial direction and/or spatial plane, between an inflow opening 11.2, via which a process fluid can flow into the flow channel 11.1 or into the flow channel structure 11, and at least one outflow opening 11.3, via which a process fluid can flow out of the flow channel 11.1 or out of the flow channel structure 11 and into the mold cavity 7, via the mold element 9.

The mold element 9 is thus designed with, or comprises, at least one or, as shown in FIG. 1-6, a plurality of, in particular nozzle-like or nozzle-shaped outflow openings 11.3, via which a process fluid flowing through the flow channel structure 11.1 or the flow channel structure 11 can flow out of the mold element 9 and into the mold cavity 7.

In particular, it is possible for the mold element 9 to be provided with a plurality of outflow openings 11.3 which are arranged or formed so as to extend over the entire cross section, such that an outflow of a process fluid is possible over the entire cross section of the mold element 9. It is also conceivable for different outflow regions to be defined, via which a process fluid can flow out in a manner dependent on or independent from one another. This can be achieved for example in that a first number of outflow openings 11.3—these can for example form a first array of outflow openings 11.3—is associated with a first flow channel 11.1, such that a first process fluid flowing through the first flow channel 11.1 can flow out into the mold cavity 7 via the first number of outflow openings 11.3, and at least one further number of outflow openings 11.3—these can for example for a further array of outflow openings 11.3—is associated with at least one further flow channel 11.*n*, such that a further process fluid flowing through the further flow channel 11.*n* can flow out into the mold cavity 7 via the further number of outflow openings 11.3. A corresponding first process fluid can differ from a corresponding further process fluid in at least one chemical parameter, such as the chemical composition, and/or physical parameter, such as the pressure, the temperature, etc.

The flow channel structure 11 can, as indicated schematically in FIG. 1-6, comprise at least one encompassing grid structure formed by a plurality of structural elements (not shown) arranged or formed in a grid-like or grid-shaped manner. Corresponding structural elements can be designed for example in a strut-like or strut-shaped manner. The grid structure can define a plurality of subspaces which communicate with one another. The grid structure can be formed so as to extend through the mold element 9, in at least one spatial plane and/or spatial direction, and therefore typically assumes a particular spatial volume of the mold element 9. The grid structure can in particular be arranged or formed in the region of a free end of the mold element 9 facing the mold cavity 7, and can communicate with outflow openings 11.3 that are arranged or formed in particular in the region of a free end facing the mold cavity 7. The grid structure can be arranged or formed so as to extend at least in portions, in particular completely, over the cross section of the mold element 9, and can thus serve as a distributor structure for distributing a process fluid, flowing through the at least one mold element 9, over the cross section of the at least one mold element 9. The grid structure can in particular be formed or manufactured in an additive manufacturing method.

The flow channel structure 11 can connectable or connected to its own process fluid supply device 13, which can in particular be operated independently of a process fluid supply device 12 of the mold cavity 7—this can for example be a vapor chamber. The process fluid—this can for example be steam or superheated steam—which can flow into the mold cavity 7 via the mold element 9 can thus be provided and introduced into the mold cavity 7 as required, independently of the process fluid flowing into the mold cavity 7 via respective openings 8 on the mold (body) wall side.

Figure 2:
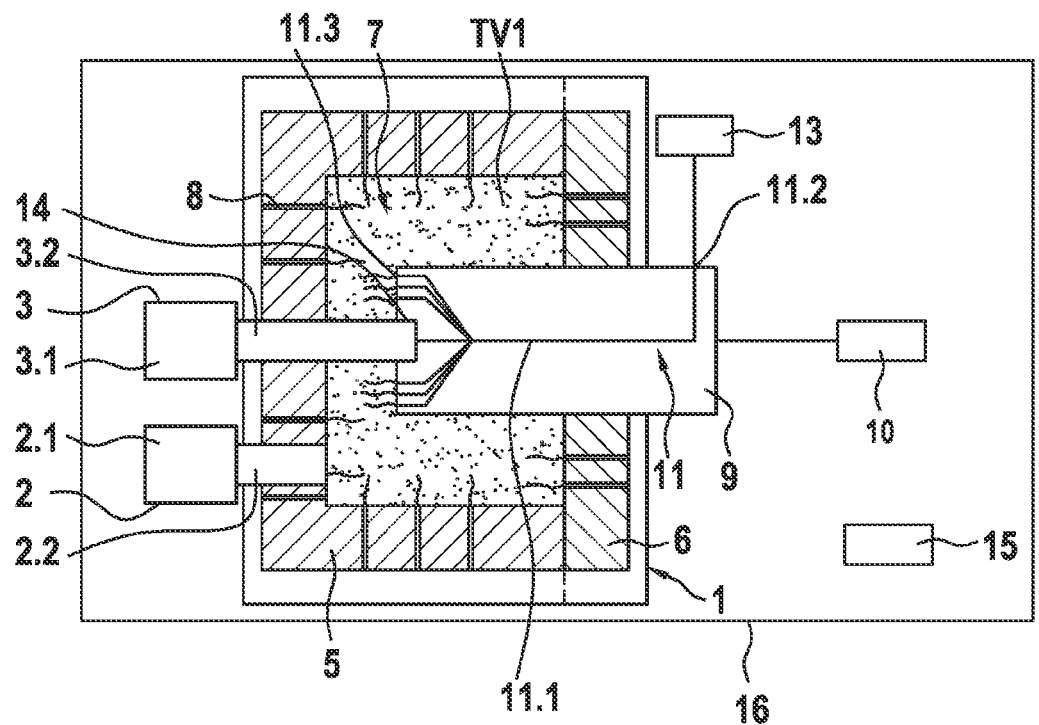

The mold element can, as shown in FIGS. 1 and 2, comprise a receiving region 14 for receiving a free end of a filling device 3 projecting into the mold cavity, for filling the mold cavity 7 with plastic particles from a further or second plastic particle material which differs from a first plastic particle material in at least one chemical parameter and/or physical parameter. The receiving region 14 can be formed for example by a recess or depression in the mold element 9, i.e. in particular in a free end of the mold element 9 facing the mold cavity 7. The receiving region 14 is designed to interact with a free end of a tube-like or tube-shaped conveying element 3.2 of the filling device 3 that projects into the mold cavity 7, such that the free end of the conveying element 3.2, typically provided with at least one opening for the outflow of plastic particles, plunges into the receiving region 14 in a sealing manner, and thus the mold element 9 surrounds the at least one opening in a sealing manner, at least in portions. This interaction is, as shown in FIGS. 1 and 2, in particular implemented when the mold element 9 is moved into the further or second orientation and/or position. The same could be achieved by sealing contact of the conveying element 3.2 on a mold element 9.

Furthermore, a device 16, at a higher level than the mold 1, for producing two-component particle foam components, can be seen in FIG. 1-6. The device 1 also comprises, in addition to the mold 1, the filling devices 2-4, the drive means 10, and the process fluid supply means 12 and 13.

The operation of the mold 1 for producing a two-component particle foam component is explained in greater detail in the following, with reference to FIG. 1-6.

A controller 15 implemented by hardware and/or software is assigned to the mold 1, which controller is designed for controlling the operation of the mold 1 or of the device 16 comprising the mold 1.

The controller 15 is designed for controlling movements of the mold element 9 from the first orientation and/or position into the at least one further or second orientation and/or position, and vice versa. The controller 15 is in particular designed to generate control information for controlling the operation of the drive means 10 associated with the mold element 9, in order to move the mold element 9 into the further or second orientation and/or position. The drive means 10 can correspondingly be operated on the basis of the control information. The controller 15 can, as shown in FIG. 1, in particular be designed to move the mold element 9, prior to the mold cavity 7 being filled with plastic particles from a first plastic particle material, into the further or second orientation and/or position. This is achieved in particular such that a first partial volume TV1 of the mold cavity 7 which can be filled, via the first filling device 2, with plastic particles from a first plastic particle material is delimited or defined by the mold (body) walls and the mold element 9 moved into the further or second orientation and/or position. The first partial volume TV1 of the mold cavity 7, which can be filled with plastic particles from the first plastic particle material, is reduced by a first amount compared with the volume of the mold cavity which can be filled with plastic particle material in the first orientation and/or position of the mold element.

The controller 15 can further be designed for controlling filling processes of the first partial volume TV1 of the mold cavity 1 with plastic particles from a first plastic particle material.

The controller 15 is in particular designed for generating control information for controlling the operation of the first filling device 2 for filling the first partial volume TV1 of the mold cavity 7 with plastic particles from a first plastic particle material, in order to fill the first partial volume TV1 of the mold cavity with plastic particles from the first plastic particle material. The first filling device 2 can correspondingly be operated on the basis of the control information. The controller 15 can in particular be designed to carry out a filling process for filling the first partial volume TV1 of the mold cavity 7 with plastic particles from a first plastic particle material, via the first filling device 2, when the mold element 9, as shown in FIG. 1, is moved into the further or second orientation and/or position.

The controller 15 can, as shown in FIG. 2, furthermore be designed for controlling measures for connecting the plastic particles from the first plastic particle material, with which the mold cavity 7 is filled. The controller 15 can in particular be designed for carrying out at least one measure for connecting the plastic particles from the first plastic particle material, with which the first partial volume TV1 of the mold cavity 7 is filled, forming a first molded part FT1 formed of the first plastic particle material, when the first partial volume TV1 of the mold cavity 7 is filled with plastic particles from the first plastic particle material. Carrying out the measure for connecting the plastic particles from the first plastic particle material thus results in the formation of a first molded part, consisting of the first plastic particle material, which occupies the first partial volume TV1 of the mold cavity 7.

The measure for connecting the plastic particles from the first plastic particle material, with which first TV1 of the mold cavity 7 is filled, can, as indicated by the curved lines in FIG. 2, include the introduction of a temperature-controlled process fluid, in particular steam, into the first partial volume TV1 of the mold cavity 7, in particular via the openings 8 on the mold (body) wall side and/or via the outflow openings 11.3 on the mold element side. The controller 15 can thus be designed to control the introduction of at least one temperature-controlled process fluid into the first partial volume TV1 of the mold cavity 7. In connection with the openings 8 on the mold (body) wall side, the process fluid can be provided via the process fluid supply device 12. In connection with the outflow openings 11.3 on the mold element side, the process fluid can (optionally) be provided via the process fluid supply device 13. In particular, it is possible for the measure to be achieved by introducing a process fluid only via the openings 8 on the mold (body) wall side.

The acquisition of the or a sufficient fill level of the first partial volume TV1 of the mold cavity 7 with plastic particles from the first plastic particle material, optionally for example in view of the desired properties of a multi-component particle foam component to be produced, can be performed by a suitable acquisition means (not shown) for acquiring the fill level of the mold cavity 7, i.e. in particular of the first partial volume TV1 of the mold cavity 7. A corresponding acquisition means can comprise one or more acquisition elements, in this case these may be for example pressure sensors, the acquisition information of which can be transmitted to the controller 15.

Figure 3:
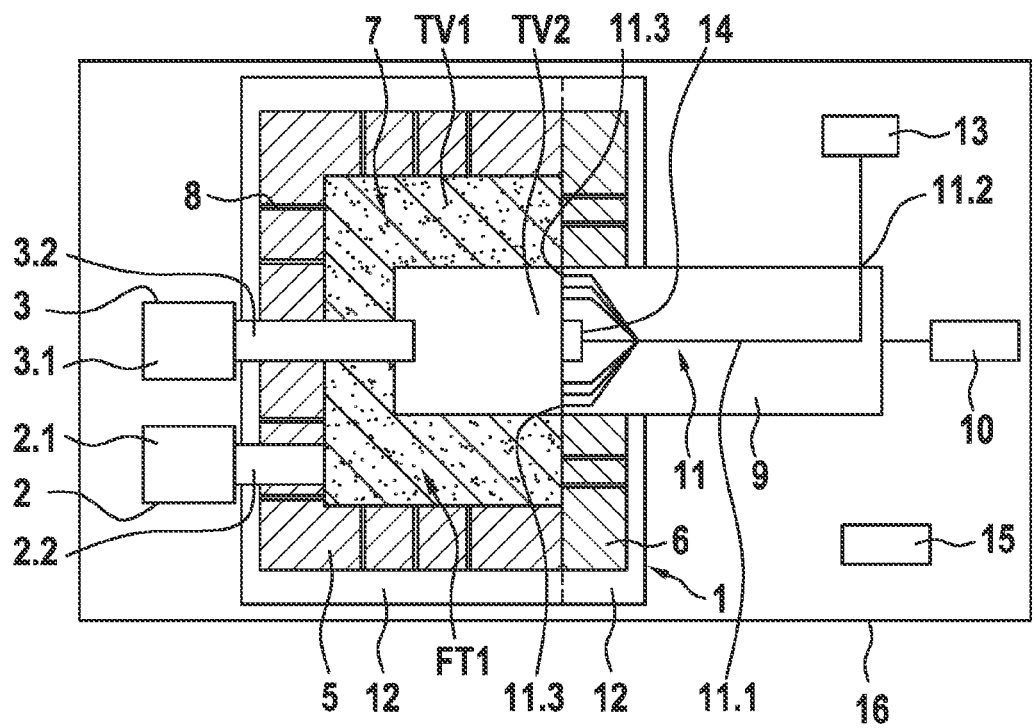

The controller 15 can, as shown in FIG. 3, furthermore be designed to move the mold element 9 from the further or second orientation and/or position, back into the first orientation and/or position, when the measure for connecting the plastic particles from the first plastic particle material is completed. The controller 15 can in particular be designed to generate control information for controlling the operation of the drive means 10 associated with the mold element 9, in order to move the mold element 9 from the further or second orientation and/or position back into the first orientation and/or position. The drive means 10 can correspondingly be operated on the basis of the control information. This is achieved in particular such that a second partial volume TV2 of the mold cavity 7 which can be filled with plastic particles from a further or second plastic particle material is delimited or defined by the first molded part FT1 and/or the mold (body) wall and/or the mold element 9 moved into the first orientation and/or position.

The acquisition of the completion of the measure for connecting the plastic particles from the first plastic particle material can be achieved by a suitable acquisition means (not shown) for acquiring the completion of the measure for connecting the plastic particles from the first plastic particle material. A corresponding acquisition means can comprise one or more acquisition elements, in this case these may be for example pressure sensors, the acquisition information of which can be transmitted to the controller 15.

Figure 4:
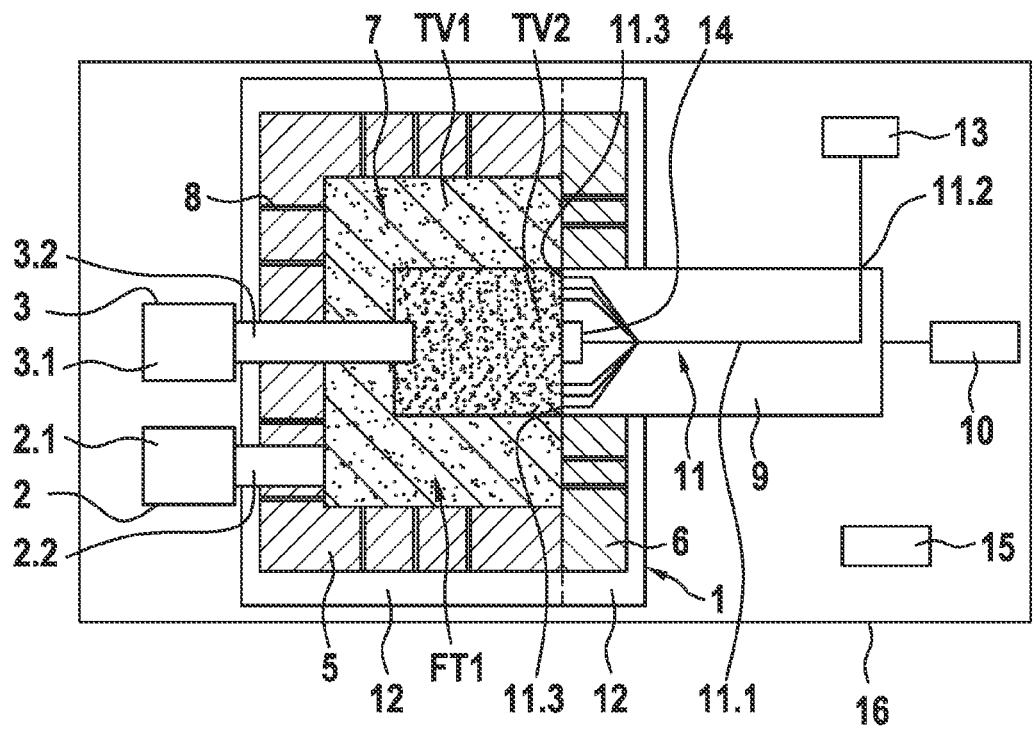

The controller 15 can, as shown in FIG. 4, be designed to carry out a filling process for filling the second partial volume TV2 of the mold cavity 7 with plastic particles from a further or second plastic particle material which differs from the first plastic particle material in at least one chemical parameter and/or physical parameter, via the second filling device 3 for filling the mold cavity 7 with plastic particles from a further or second plastic particle material which differs from the first plastic particle material in at least one chemical parameter and/or physical parameter, when the mold element 9, as shown in FIG. 4, is moved into the first orientation and/or position. The controller 15 is in particular designed for generating control information for controlling the operation of the second filling device 3 in order to fill the second partial volume 7 of the mold cavity 7 with plastic particles from the second plastic particle material. The second filling device 3 can correspondingly be operated on the basis of the control information. The second filling device 3 can correspondingly be operated on the basis of the control information.

The acquisition of the movement of the mold element 9 into the first orientation and/or position can be achieved via a suitable acquisition means (not shown) for acquiring movements of the mold element 9 into the first orientation and/or position. A corresponding acquisition means can comprise one or more acquisition elements, in this case these may be for example travel sensors, the acquisition information of which can be transmitted to the controller.

Figure 5:
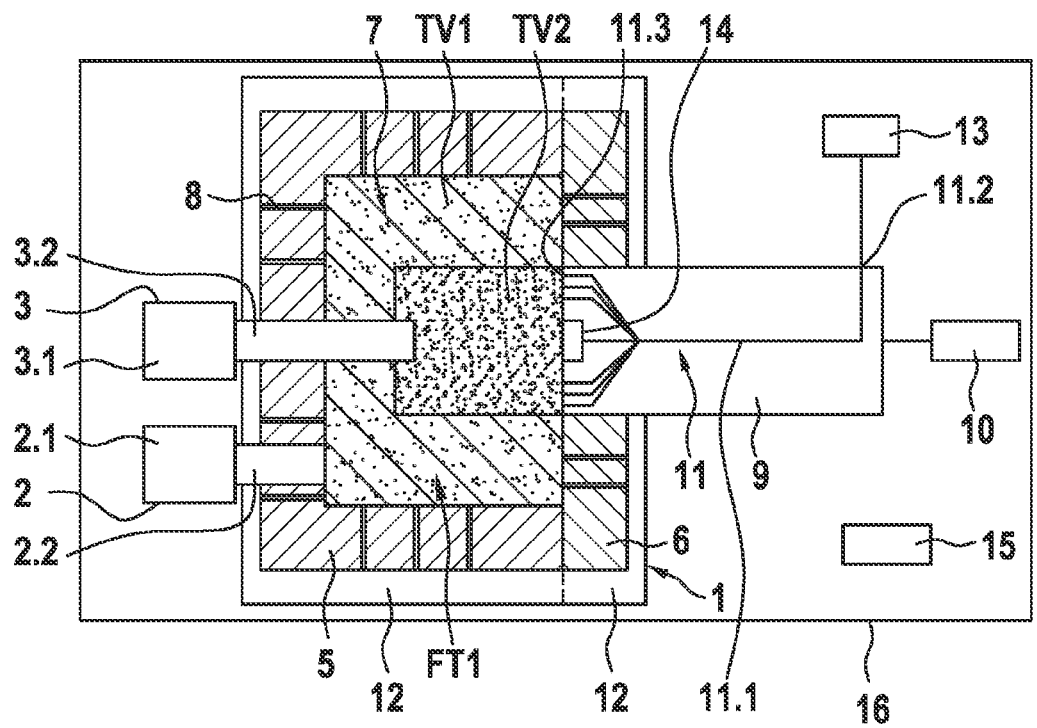

The controller 15 can, as shown in FIG. 5, be designed for carrying out at least one measure for connecting the plastic particles from the further or second first plastic particle material, with which the second partial volume TV2 of the mold cavity 7 is filled, forming a second molded part FT2 formed of the further or second plastic particle material, when the second partial volume TV2 of the mold cavity 7 is filled with plastic particles from the further or second plastic particle material. Carrying out the measure for connecting the plastic particles from the further or second plastic particle material thus results in the formation of a second molded part FT2, consisting of the further or second plastic particle material, which occupies the second partial volume TV2 of the mold cavity 7. The second molded part FT2 can be connected to the first molded part FT1, in particular in a form-fitting and/or force-fitting and/or integrally bonded manner, forming the multi-component particle foam component to be produced.

The measure for connecting the plastic particles from the further or second plastic particle material, with which second partial volume TV2 of the mold cavity 7 is filled, can, as indicated by the curved lines in FIG. 5, include introduction of a temperature-controlled process fluid into the further or second partial volume TV2 of the mold cavity 7 via the openings 8 on the mold (body) wall side and/or via the outflow openings 11.3 on the mold element side. In connection with the openings 8 on the mold (body) wall side, the process fluid can be provided via the process fluid supply device 12. In connection with the outflow openings 11.3 on the mold element side, the process fluid can be provided via the process fluid supply device 13. In particular, it is possible for the measure to be achieved by introducing a process fluid only via the outflow openings 11.3 on the mold element side.

The acquisition of the or a sufficient fill level of the second partial volume TV2 of the mold cavity 7 with plastic particles from the further or second plastic particle material, optionally for example in view of the desired properties of a multi-component particle foam component to be produced, can be performed by a suitable acquisition means (not shown) for acquiring the fill level of the mold cavity, i.e. in particular of the second partial volume TV2 of the mold cavity. A corresponding acquisition means can comprise one or more acquisition elements, in this case these may be for example pressure sensors, the acquisition information of which can be transmitted to the controller 15.

Figure 6:
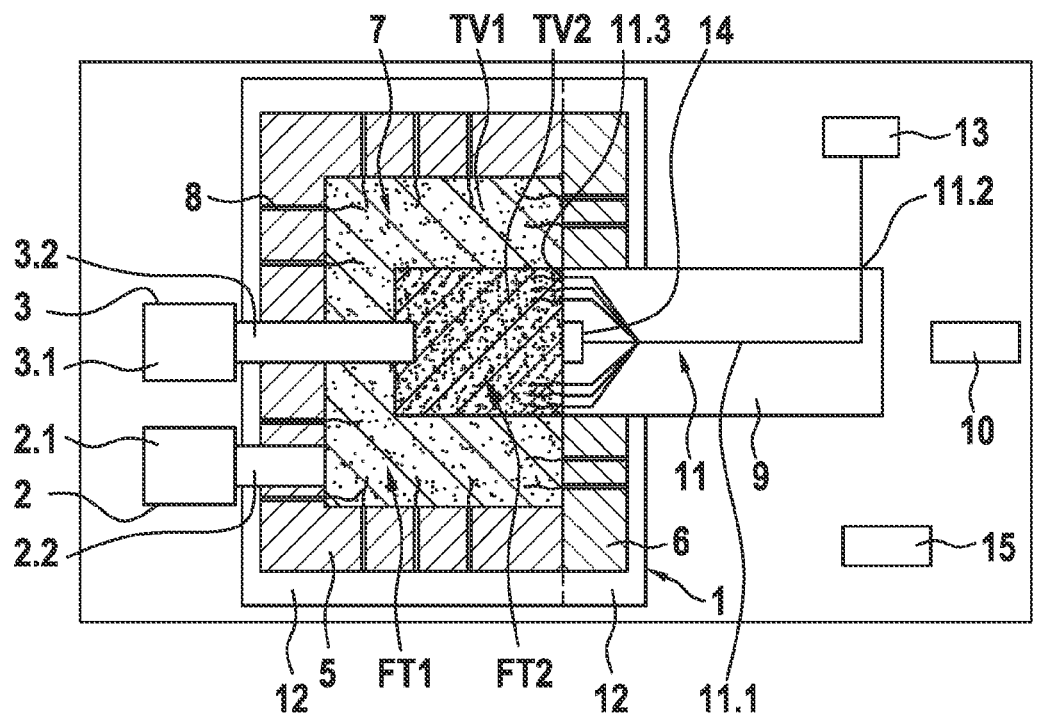

The controller 15 can, as shown in FIG. 6, furthermore be assigned for controlling measures for evacuating and/or cooling the mold cavity 7. The controller 7 can be designed to carry out a measure for evacuating and/or cooling the mold cavity 7 via a device (not shown in further detail) for evacuating and/or cooling the mold cavity 7, when the measure for connecting the plastic particle from the further or second plastic particle material, with which the mold cavity 7 is filled, is completed. The evacuation and/or cooling of the mold cavity 7 can, as indicated in FIG. 6 by the curved lines, take place for example via individual, a plurality of or all the openings 8 on the mold (body) wall side and/or outflow openings 11.3 on the mold element side.

The acquisition of the completion of the measure for connecting the plastic particles from the further or second plastic particle material can be achieved by a suitable acquisition means (not shown) for acquiring the completion of the measure for connecting the plastic particles from the further or second plastic particle material. A corresponding acquisition means can comprise one or more acquisition elements, in this case these may be for example pressure sensors, the acquisition information of which can be transmitted to the controller 15.

Finally, removal of the multi-component particle foam component from the mold cavity 7 can take place.

The operation of the mold 1 for producing a three-component particle foam component is explained in greater detail in the following, with reference to the embodiment shown in FIG. 7-15.

It is evident that in this case, compared with the mold 1 shown in FIG. 1-6, the mold 1 comprises three filling devices 2-4, via which in each case the mold cavity 7 can be filled with plastic particles from a particular plastic particle material.

Figure 7:
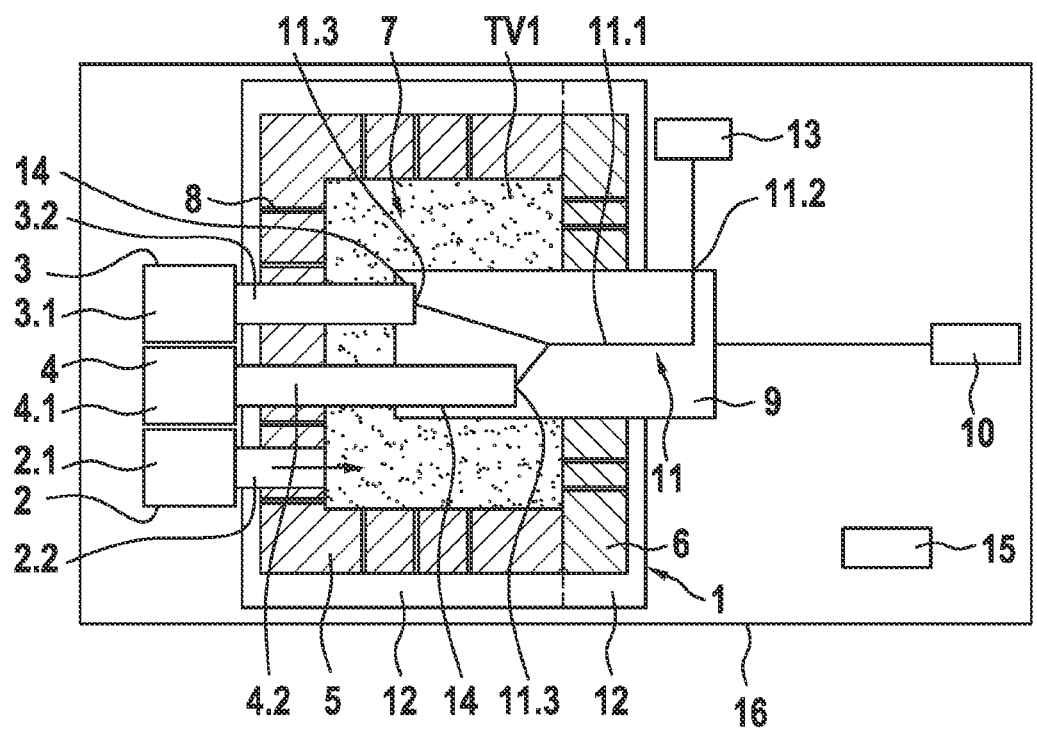
FIG. 7-15 are each schematic views of a mold according to a further embodiment.
Figure 8:
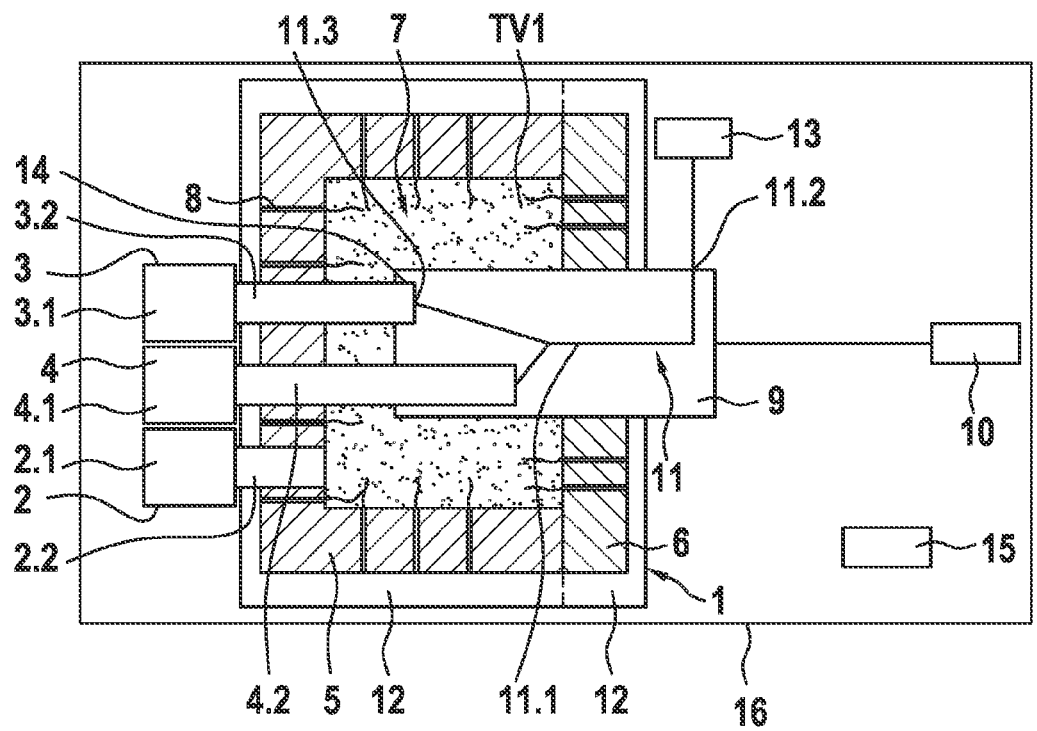

The states shown in FIGS. 7 and 8 correspond to the states shown in FIGS. 1 and 2, i.e. a first partial volume TV1 of the mold cavity 7 is delimited or defined by moving the mold element 9 into the second orientation and/or position, the first partial volume TV1 of the mold cavity 7 is filled, via the first filling device 2, with plastic particles from a first plastic particle material, and a measure for connecting the plastic particles from the first plastic particle material, forming a first molded part FT1, is carried out.

Figure 9:
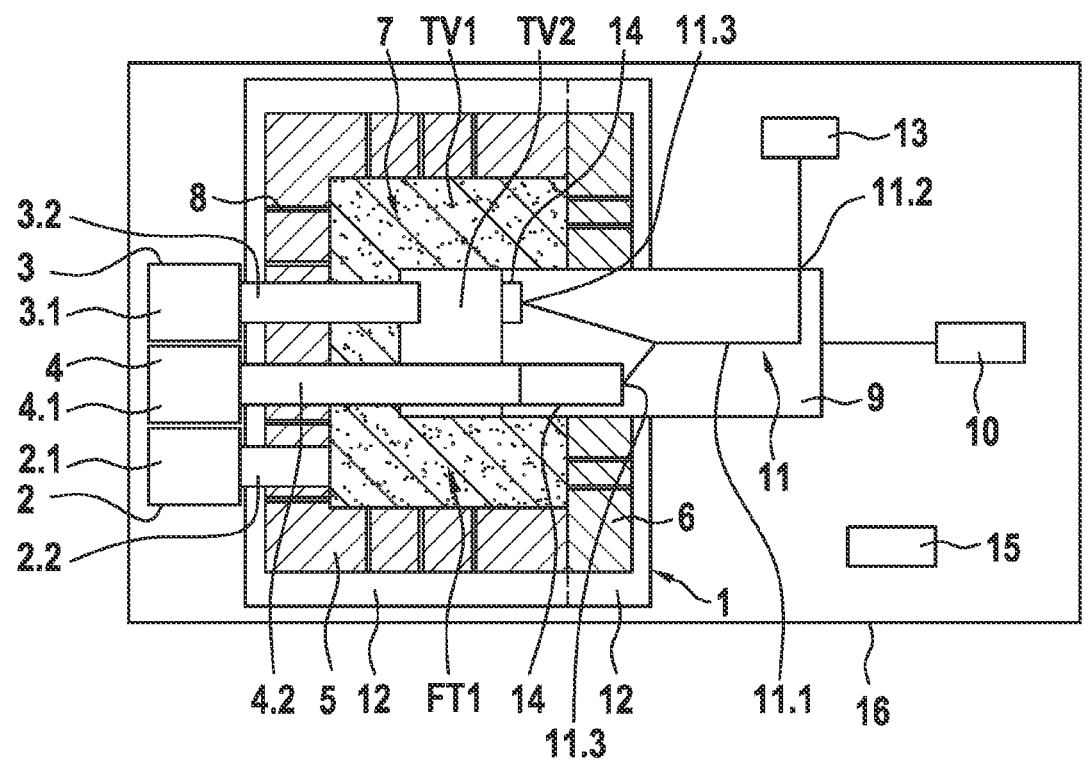

The controller 15 is however, as shown in FIG. 9, additionally designed, compared with the embodiment shown in FIG. 1-6, to move the mold element 9 from the second orientation and/or position into a third orientation and/or position, when the measure, carried out as described above, for connecting the plastic particles from the first plastic particle material is completed. The controller 15 is in particular designed to generate control information for controlling the operation of the drive means 10, in order to move the mold element 9 into the third orientation and/or position. The drive means 10 can correspondingly be operated on the basis of the control information. This is achieved in particular such that a second partial volume TV2 of the mold cavity 7 which can be filled with plastic particles from a second plastic particle material, via the second filling device 3, is delimited or defined by the first molded part FT1 and/or the mold (body) wall and/or the at least one mold element 9 moved into the third orientation and/or position.

Figure 10:
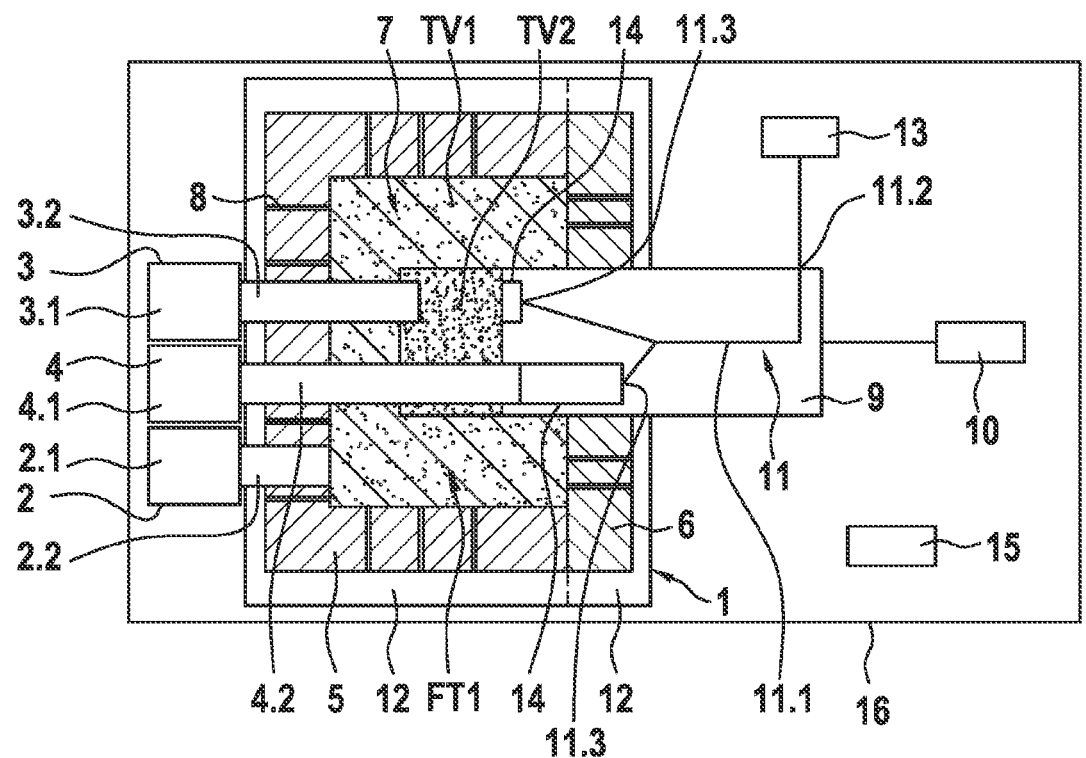

The controller 15 is, as shown in FIG. 10, designed to carry out a filling process for filling the second partial volume TV2 of the mold cavity 7 with plastic particles from a second plastic particle material which differs from the first plastic particle material in at least one chemical parameter and/or physical parameter, via the third filling device 3 for filling the second partial volume TV2 of the mold cavity 7, when the mold element 9 is moved into the second orientation and/or position. The controller 15 is in particular designed for generating control information for controlling the operation of the second filling device 3, in order to fill the second partial volume TV2 of the mold cavity 7 with plastic particles from the second plastic particle material. The second filling device 3 can correspondingly be operated on the basis of the control information.

Figure 11:
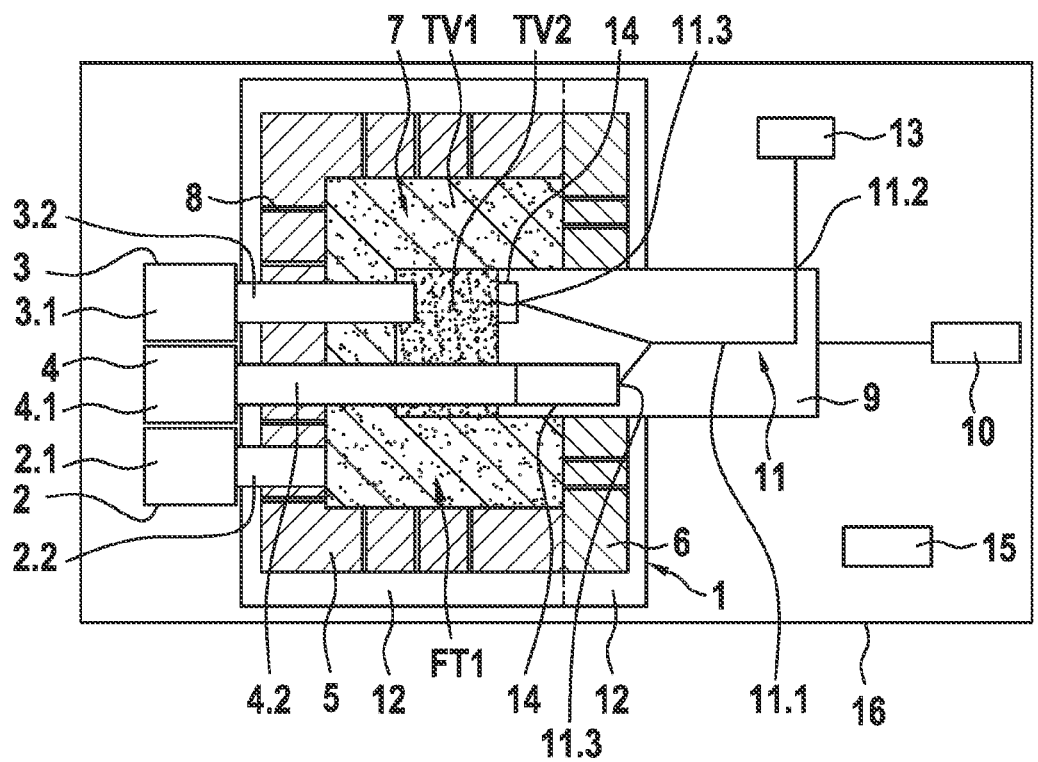

The controller 15 is, as shown in FIG. 11, designed for carrying out at least one measure for connecting the plastic particles from second first plastic particle material, with which the second partial volume TV2 of the mold cavity 7 is filled, forming a second molded part FT2 formed of the second plastic particle material, when the second partial volume TV2 of the mold cavity 7 is filled with plastic particles from the second plastic particle material. Carrying out the measure for connecting the plastic particles from the second plastic particle material thus results in the formation of a second molded part FT2, consisting of the second plastic particle material, which occupies a partial volume of the mold cavity 7. The second molded part FT2 can be connected to the first molded part FT1, in particular in a form-fitting and/or force-fitting and/or integrally bonded manner.

The measure for connecting the plastic particles from the second plastic particle material, with which the mold cavity 7 is filled, can, as indicated by the curved lines in FIG. 11, include introduction of a temperature-controlled process fluid into the second partial volume TV2 of the mold cavity 7 via openings 8 on the mold (body) wall side and/or via the outflow openings 11.3 on the mold element side. In particular, it is possible for the measure to be achieved by introducing a process fluid only via the outflow openings 11.3 on the mold element side.

Figure 12:
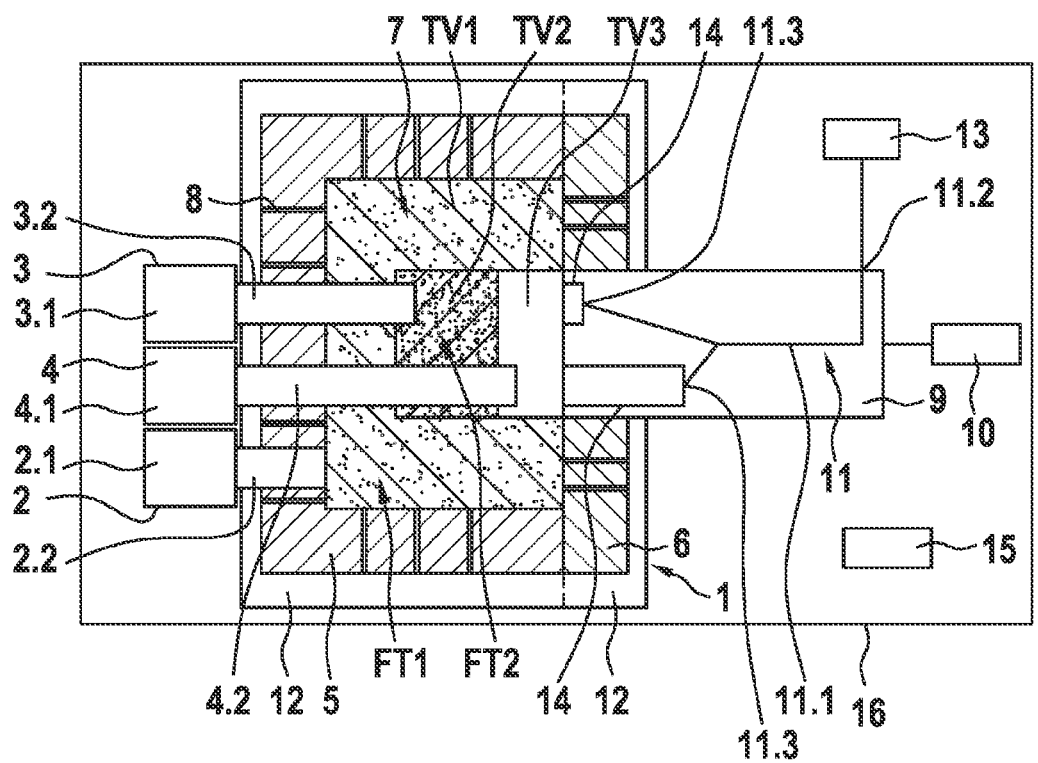

The controller 15 can, as shown in FIG. 12, furthermore be designed to move the mold element 9 from the third orientation and/or position into the first orientation and/or position, when the measure for connecting the plastic particles from the second plastic particle material is completed. The controller 15 is in particular designed to generate control information for controlling the drive means 10 associated with the mold element 9, in order to move the mold element 9 from the third orientation and/or position into the first orientation and/or position. The drive means 10 can correspondingly be operated on the basis of the control information. This is achieved in particular such that a third partial volume TV3 of the mold cavity 7 which can be filled with plastic particles from a third plastic particle material is delimited or defined by the first molded part FT1 and/or the second molded part FT2 and/or the mold (body) wall and/or the mold element 9 moved into the third orientation and/or position.

Figure 13:
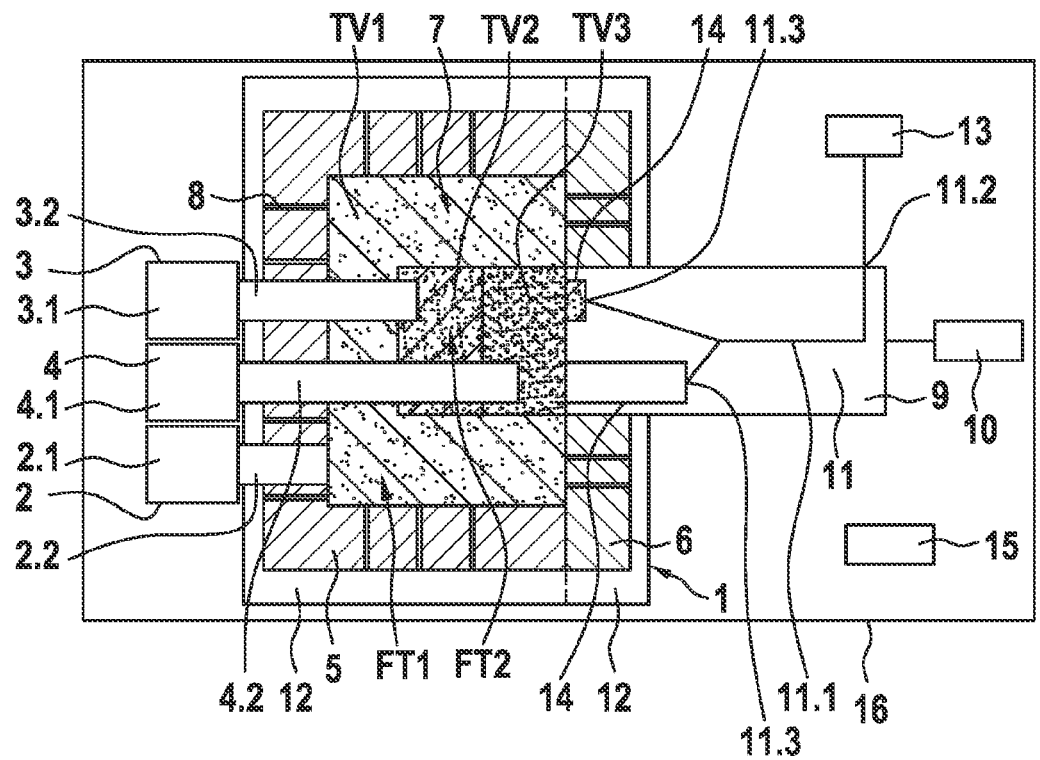

The controller 15 can, as shown in FIG. 13, be designed to carry out a filling process for filling the third partial volume TV3 of the mold cavity 7 with plastic particles from a third plastic particle material which differs from the first plastic particle material and/or the second plastic particle material in at least one chemical parameter and/or physical parameter, via the third filling device 4 for filling the third partial volume TV3 of the mold cavity 7 with plastic particles form the third plastic particle material, when the mold element 9 is moved into the first orientation and/or position. The controller 15 is in particular designed for generating control information for controlling the operation of the third filling device 4, in order to fill the third partial volume TV3 with plastic particles from the third plastic particle material. The third filling device 4 can correspondingly be operated on the basis of the control information.

Figure 14:
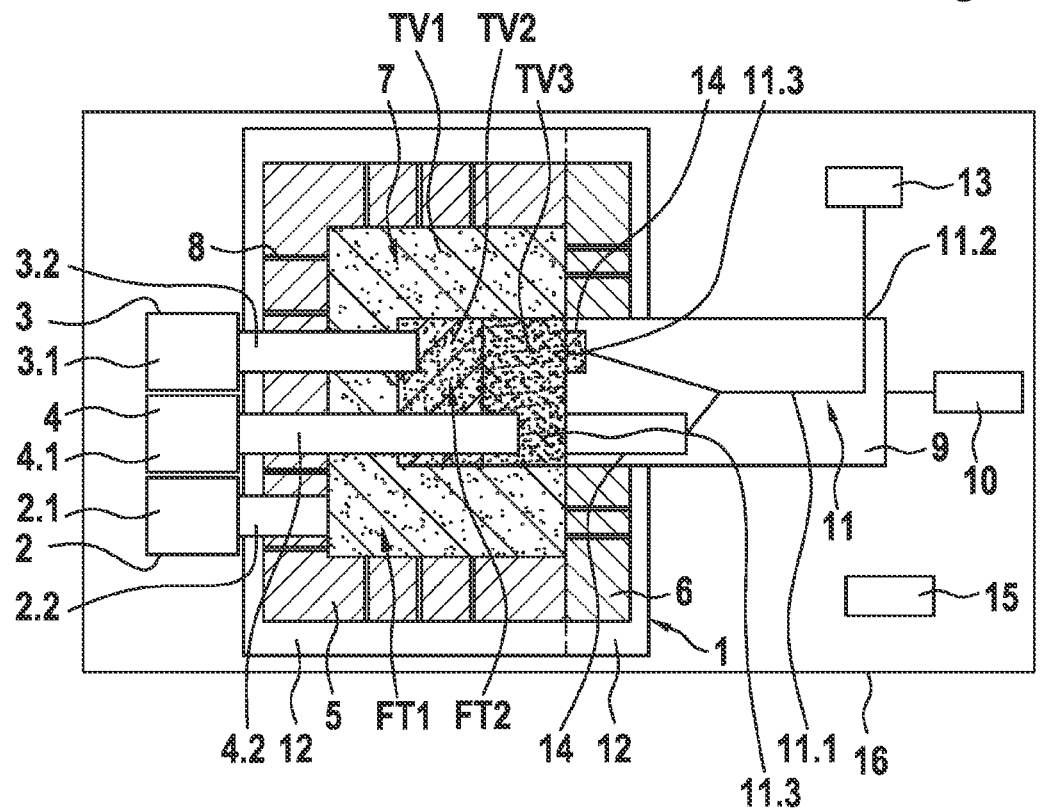

The controller 15 is, as shown in FIG. 14, designed for carrying out at least one measure for connecting the plastic particles from third first plastic particle material, with which the third partial volume TV3 of the mold cavity 7 is filled, forming a third molded part FT3 formed of the third plastic particle material, when the third partial volume TV3 of the mold cavity 7 is filled with plastic particles from the third plastic particle material. Carrying out the measure for connecting the plastic particles from the third plastic particle material thus results in the formation of a third molded part FT3, consisting of the third plastic particle material, which occupies a partial volume of the mold cavity 7. The third molded part FT3 can be connected to the first molded part FT1 and/or to the second molded part FT2, in particular in a form-fitting and/or force-fitting and/or integrally bonded manner, forming the multi-component particle foam component to be produced.

The measure for connecting the plastic particles from the third plastic particle material, with which the mold cavity 7 is filled, can, as indicated by the curved lines in FIG. 14, include introduction of a temperature-controlled process fluid into the third partial volume TV3 of the mold cavity 7 via openings 8 on the mold (body) wall side and/or via the outflow openings 11.3 on the mold element side. In particular, it is possible for the measure to be achieved by introducing a process fluid only via the outflow openings 11.3 on the mold element side.

Figure 15:
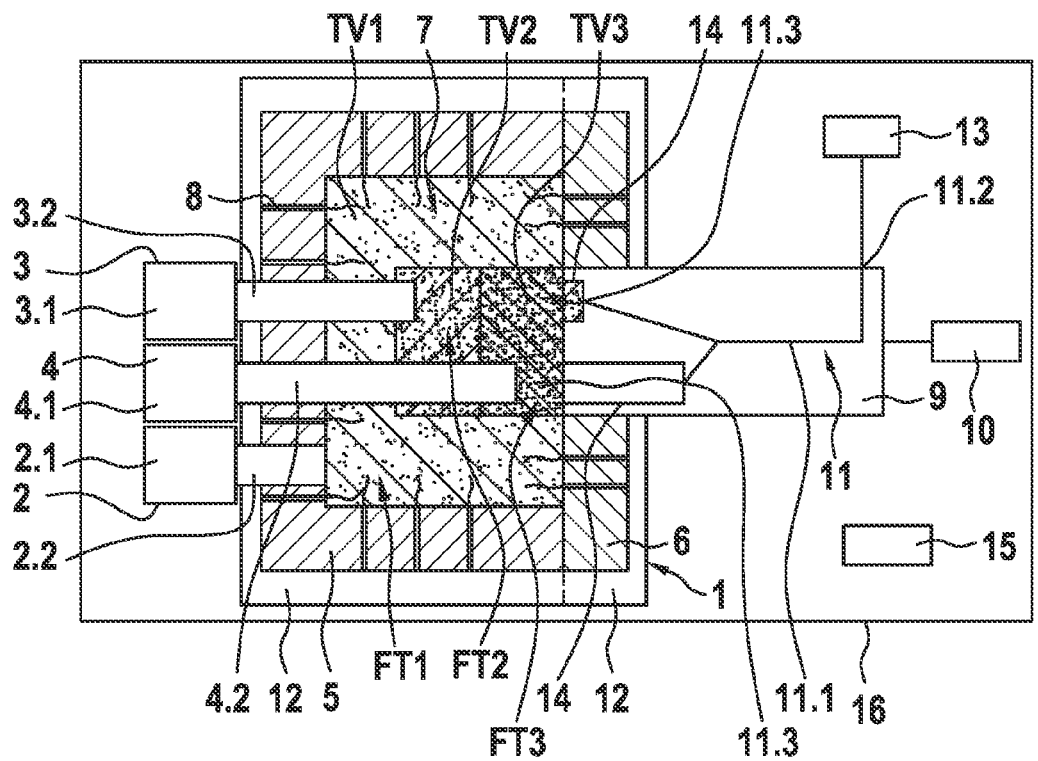

The controller 15 can, as shown in FIG. 15, furthermore be designed for controlling measures for evacuating and/or cooling the mold cavity 7. The controller 15 is in particular designed to carry out a measure for evacuating and/or cooling the mold cavity 7 via a device for evacuating and/or cooling the mold cavity 7, when the measure for connecting the plastic particles from the third plastic particle material, with which the mold cavity 7 is filled, is completed. The evacuation and/or cooling of the mold cavity 7 can, as indicated in FIG. 15 by the curved lines, take place for example via individual, a plurality of or all the openings 8 on the mold (body) wall side and/or outflow openings 11.3 on the mold element side.

Finally, removal of the multi-component particle foam component from the mold cavity 7 can take place.

Figure 16:
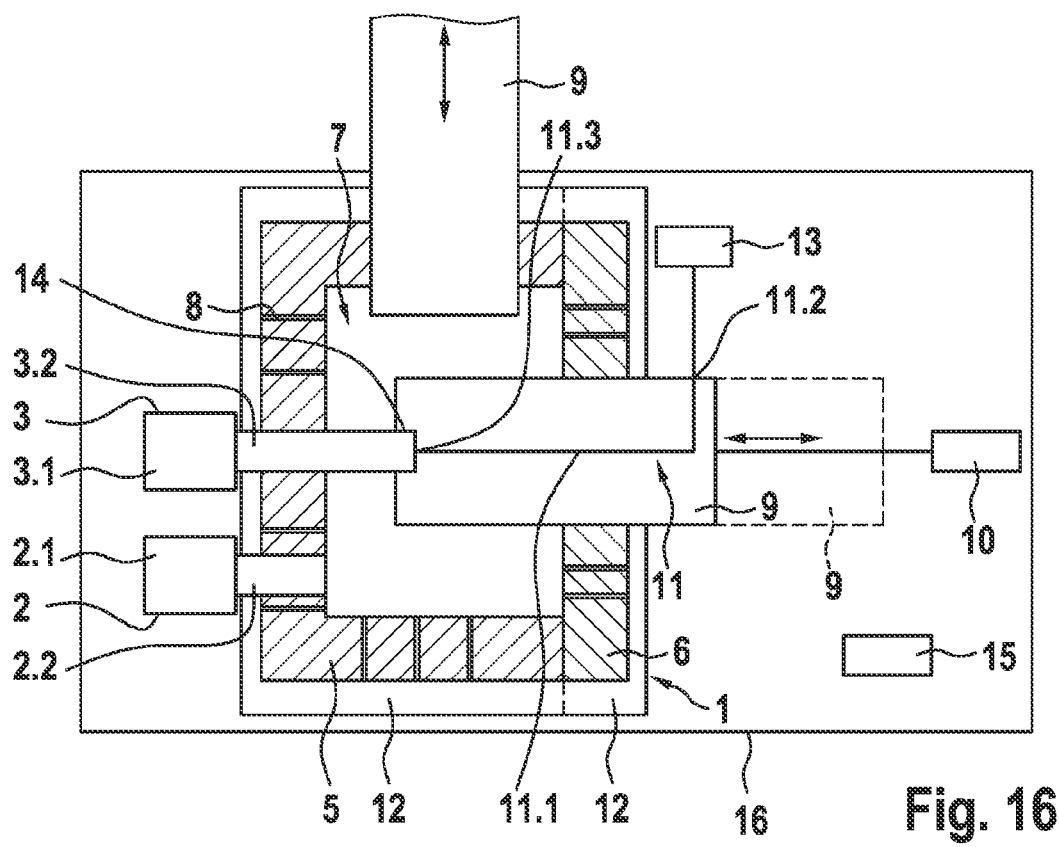
FIG. 16 is a schematic view of a mold according to a further embodiment.

FIG. 16 is a schematic view of a mold 1 according to a further embodiment.

With reference to FIG. 16 it is evident, by way of example, that the mold 1 can also comprise a plurality of corresponding mold elements 9. Therefore, at least two mold elements 9 can extend from the same or different mold (body) walls, into the mold cavity 7, in the respective further orientations and/or positions thereof. In this case, corresponding mold elements 9 can extend not in parallel with one another or in parallel with one another into the mold cavity 7, in the respective further orientations and/or positions thereof, as shown byway of example in FIG. 16. As mentioned, the configuration of the mold 1 shown in FIG. 16 is to be understood merely by way of example; in principle, every mold body 5, 6 or every mold (body) wall can be associated with at least one corresponding mold element 9.

It is the case, for all embodiments, that the respective mold elements 9 are typically mounted in a receptacle or bearing (not shown), for this purpose, on the mold (body) side. The mold 1 can thus be equipped with receiving or bearing portions, for example in the form or shape of drilled holes. In this case, these can specifically be for example bearing bores, into which a corresponding mold element 9 can be inserted, in particular typically in an exactly fitting manner.

It is furthermore the case, for all embodiments, that closure means (not shown) can be provided on the side of the mold element 9 or on the side of the mold 1, i.e. in particular on the side of the mold body 6, which, as shown by way of example in the figures, prevent plastic particles from being able to enter the respective recesses 14 on the mold element side.

It is clear from FIG. 1-15 that the relevant particle foam component is formed by or comprises the respective molded parts FT1-F3.

A method for processing expandable or expanded plastic particles producing a multi-component particle foam component can be implemented by means of the molds 1 shown in the figures.

The method in particular includes the movements of the mold element 9 explained in connection with the operation of the mold 1, the filling processes of respective partial volumes TV1-TV3 of the mold cavity 7 created by corresponding movements of the mold element 9, and the connection processes for connecting respective plastic particles with which respective partial volumes TV1-TV3 of the mold cavity 7 are filled.

The invention claimed is:

1. A mold for processing expandable or expanded plastic particles for producing a multi-component particle foam component, comprising a mold cavity delimited by mold walls, comprising
   at least one mold element, wherein the at least one mold element is mounted so as to be movable between a first orientation and/or position and at least one further orientation and/or position in which it projects at least in portions into the mold cavity, and
   wherein the at least one mold element is designed with, or comprises, a flow channel structure having at least one flow channel which extends inside the mold element and through which a process fluid can flow; wherein the flow channel structure is connected to its own process fluid supply device, which is operable independently of a process fluid supply device of the mold cavity.

2. The mold according to claim 1, wherein the at least one mold element or the at least one flow channel structure, is formed at least in portions in an additive manufacturing method.

3. The mold according to claim 1, wherein the flow channel structure comprises an encompassing grid structure formed by a plurality of structural elements arranged or formed in a grid-shaped manner.

4. The mold according to claim 1, wherein the at least one mold element is formed having or comprises at least one nozzle-shaped outflow opening, via which a process fluid flowing through the flow channel structure can flow out of the at least one mold element and into the mold cavity.

5. The mold according to claim 1, further comprising a controller for controlling movements of the at least one mold element from the first orientation and/or position into the at least one further orientation and/or position, and vice versa, wherein the controller is designed to move the at least one mold element, prior to the mold cavity being filled with plastic particles from a first plastic particle material, into the second orientation and/or position such that a first partial volume of the mold cavity which can be filled with plastic particles from a first plastic particle material is delimited or defined by the mold walls and the at least one mold element moved into the further orientation and/or position.

6. The mold according to claim 5, further comprising a controller for controlling the filling processes of the mold cavity with plastic particles, wherein the controller is designed to perform a filling process for filling the first partial volume of the mold cavity with plastic particles of a first plastic particle material via a filling device, when the at least one mold element is moved into the further orientation and/or position.

7. The mold according to claim 5, further comprising a controller for controlling measures for connecting plastic particles with which the mold cavity is filled, wherein the controller is designed for carrying out at least one measure for connecting the plastic particles from the first plastic particle material, with which the first partial volume of the mold cavity is filled, forming a first molded part formed of the first plastic particle material, when the first partial volume of the mold cavity is filled with plastic particles from the first plastic particle material.

8. The mold according to claim 7, wherein the measure for connecting the plastic particles from the first plastic particle material, with which the mold cavity is filled, includes an introduction of a temperature-controlled process fluid into the first partial volume of the mold cavity via openings on a mold wall side and/or via outflow openings on a mold element side.

9. The mold according to claim 5, wherein the controller designed for controlling movements of the at least one mold element is designed to move the at least one mold element from the further orientation and/or position into the first orientation and/or position, when the measure for connecting the plastic particles from the first plastic particle material is completed such that a second partial volume of the mold cavity which can be filled with plastic particles from a further plastic particle material is delimited or defined by the first molded part and/or the mold walls and/or the at least one mold element moved into the first orientation and/or position.

10. The mold according to claim 5, wherein the controller, designed for controlling the filling processes of the mold cavity, is designed to perform a filling process for filling the second partial volume of the mold cavity with plastic particles of a further plastic particle material which differs from the first plastic particle material in at least one chemical parameter and/or physical parameter, via a filling device when the at least one mold element is moved into the first orientation and/or position.

11. The mold according to claim 5, wherein the controller designed for controlling measures for connecting plastic particles with which the mold cavity is filled is designed for carrying out at least one measure for connecting the plastic particles from the further plastic particle material, with which the second partial volume of the mold cavity is filled, forming a second molded part formed of the further plastic particle material, when the second partial volume of the mold cavity is filled with plastic particles from the further plastic particle material.

12. The mold according to claim 11, wherein the measure for connecting the plastic particles from the further plastic particle material, with which the mold cavity is filled, includes an introduction of a temperature-controlled process fluid into the second partial volume of the mold cavity via openings on a mold wall portion side and/or via outflow openings on the mold element side.

13. The mold according to claim 5, further comprising a controller for controlling measures for evacuating and/or cooling the mold cavity, wherein the controller is designed to carry out a measure for evacuating and/or cooling the mold cavity via a device for evacuating and/or cooling the mold cavity, when the measure for connecting plastic particles from the further plastic particle material, with which the mold cavity is filled, is completed.

14. The mold according to claim 1, further comprising a plurality of mold elements which are correspondingly mounted so as to be movable between a first orientation and/or position and at least one further orientation and/or position.

15. The mold according to claim 14, wherein at least two mold elements extend in parallel with one another or not in parallel with one another, into the mold cavity, in the respective further orientations and/or positions thereof.

16. A mold element for a mold according to claim 1.

17. A device for processing expandable or expanded plastic particles producing a multi-component particle foam component, comprising at least one mold according to claim 1, at least one filling device for filling the mold cavity of the mold, at least one drive means for generating a drive force and/or a drive torque, via which the at least one mold element can be moved into the respective orientations and/or positions, and at least one process fluid supply device for supplying the mold cavity with a process fluid.

18. A method for processing expandable or expanded plastic particles for producing a multi-component particle foam component, wherein at least one mold according to claim 1 is used for carrying out the method.

* * * * *